US009687819B2

(12) United States Patent
Yin et al.

(10) Patent No.: US 9,687,819 B2
(45) Date of Patent: Jun. 27, 2017

(54) CATALYST AND METHOD OF MANUFACTURE

(71) Applicant: General Electric Company, Schenectady, NY (US)

(72) Inventors: Ming Yin, Rexford, NY (US); Larry Neil Lewis, Scotia, NY (US); Oltea Puica Siclovan, Rexford, NY (US); Dan Hancu, Clifton Park, NY (US); Benjamin Hale Winkler, Albany, NY (US); Daniel George Norton, Niskayuna, NY (US); Ashish Balkrishna Mhadeshwar, Storrs, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 610 days.

(21) Appl. No.: 13/892,954

(22) Filed: May 13, 2013

(65) Prior Publication Data

US 2013/0303365 A1 Nov. 14, 2013

Related U.S. Application Data

(62) Division of application No. 12/624,663, filed on Nov. 4, 2009, now abandoned.

(51) Int. Cl.
| | |
|---|---|
| *B01J 23/50* | (2006.01) |
| *B01J 21/04* | (2006.01) |
| *B01J 29/068* | (2006.01) |
| *B01J 35/00* | (2006.01) |
| *B01J 37/02* | (2006.01) |
| *B01J 37/03* | (2006.01) |
| *F01N 3/025* | (2006.01) |
| *F01N 3/20* | (2006.01) |
| *F01N 13/00* | (2010.01) |
| *B01J 35/10* | (2006.01) |
| *F01N 3/035* | (2006.01) |

(52) U.S. Cl.
CPC .............. *B01J 23/50* (2013.01); *B01J 21/04* (2013.01); *B01J 29/068* (2013.01); *B01J 35/0006* (2013.01); *B01J 35/0013* (2013.01); *B01J 37/0203* (2013.01); *B01J 37/0211* (2013.01); *B01J 37/035* (2013.01); *B01J 37/036* (2013.01); *F01N 3/025* (2013.01); *F01N 3/2066* (2013.01); *F01N 13/009* (2014.06); *F01N 13/0093* (2014.06); *B01J 35/1061* (2013.01); *B01J 35/1085* (2013.01); *F01N 3/035* (2013.01); *F01N 2240/30* (2013.01); *F01N 2370/02* (2013.01); *F01N 2370/04* (2013.01); *F01N 2610/03* (2013.01); *F01N 2610/04* (2013.01); *Y02T 10/24* (2013.01)

(58) Field of Classification Search
USPC ....... 502/305, 306, 307, 309, 312, 313, 314, 502/318, 320, 323, 325, 327, 330, 332, 502/333, 334, 336, 339, 341, 342, 343, 502/344, 347, 348; 977/773
See application file for complete search history.

(56) References Cited

U.S. PATENT DOCUMENTS

| | | | |
|---|---|---|---|
| 5,244,852 | A | 9/1993 | Lachman et al. |
| 5,750,461 | A | 5/1998 | Engelhardt et al. |
| 6,087,295 | A | 7/2000 | Kharas et al. |
| 6,087,299 | A | 7/2000 | Grub et al. |
| 6,284,211 | B1 | 9/2001 | Miyadera et al. |
| 6,365,118 | B1 | 4/2002 | Kharas et al. |
| 6,846,471 | B2 | 1/2005 | Hotta et al. |
| 7,220,692 | B2 | 5/2007 | Marshall et al. |
| 7,655,203 | B2 | 2/2010 | Hancu et al. |
| 2006/0228283 | A1 | 10/2006 | Malyaia et al. |
| 2007/0092421 | A1 | 4/2007 | Hancu et al. |
| 2008/0053073 | A1 | 3/2008 | Kalyanaraman et al. |
| 2008/0233039 | A1 | 9/2008 | Hagemeyer et al. |
| 2009/0074641 | A1 | 3/2009 | Lewis et al. |
| 2010/0196236 | A1 | 8/2010 | Lewis et al. |
| 2010/0233053 | A1 | 9/2010 | Lewis et al. |
| 2010/0233054 | A1 | 9/2010 | Steiner et al. |

FOREIGN PATENT DOCUMENTS

| | | |
|---|---|---|
| CN | 101541402 A | 9/2009 |
| CN | 101816933 A | 9/2010 |
| EP | 0714693 A1 | 6/1996 |
| EP | 0947236 A1 | 10/1999 |
| EP | 1832345 A1 | 9/2007 |
| WO | WO2006093802 A2 | 9/2006 |
| WO | WO2009019238 A1 | 2/2009 |

OTHER PUBLICATIONS

Bhattacharyya et al., "Sonochemical Insertion of Silver Nanoparticles into Two-Dimensional Mesoporous Alumina", J. Phys. Chem. C, 111, pp. 11161-11167, 2007.*

Seker et al., "Nitric Oxide Reduction by Propene Over Silver/Alumina and Silver-Gold/Alumina Catalysts: Effect of Preparation Methods", Applied Catalysis A: General, vol. 183, No. 1, pp. 121-134, Jul. 5, 1999, XP004271836.

Richter et al., "The Effect of Hydrogen on the Selective Catalytic Reduction of NO in Excess Oxygen over Ag/Al2O3", Applied Catalysis B: Environmental, vol. 51, No. 4, pp. 261-274, Aug. 25, 2004, XP002592359.

(Continued)

*Primary Examiner* — Elizabeth Wood

(57) ABSTRACT

A catalyst system comprising a first catalytic composition comprising a homogeneous solid mixture containing at least one catalytic metal and at least one metal inorganic support. The pores of the solid mixture have an average diameter in a range of about 1 nanometer to about 15 nanometers. The catalytic metal comprises nanocrystals.

13 Claims, 19 Drawing Sheets

(56) References Cited

OTHER PUBLICATIONS

Alie et al., "Preparation and Characterization of Xerogel Catalyst Microspheres", Journal of Non-Crystalline Solids, vol. 350, pp. 290-298, Dec. 15, 2004, XP004905673.
Hancu et a l., Patent Application entitled, "Multi-Bed Selective Catalytic Reduction System and Method for Reducing Nitrogen Oxides Emissions", U.S. Appl. No. 11/606,432, filed Nov. 30, 2006, 21 pages.
Whisenhunt, Jr., et al., Patent Application entitled, "Catalyst and Method of Manufacture", U.S. Appl. No. 12/173,492, filed Jul. 15, 2008, 19 pages.
Whisenhunt, Jr., et al., Patent Application entitled, "Catalyst and Method of Manufacture", U.S. Appl. No. 12/474.873, filed May 29, 2009, 28 pages.
Lewis et al., Patent Application entitled, "Catalyst and Method of Manufacture", U.S. Appl. No. 12/123,070, filed May 19, 2008, 39 pages.
European Search Report dated Jun. 21, 2011.
Unofficial English translation of Chinese Office Action and Search Report issued in connection with corresponding CN Application No. 201110007574.8 on Apr. 21, 2015.

\* cited by examiner 20 nanometers 2 nanometers 100 nanometers 20 nanometers

CATALYST AND METHOD OF MANUFACTURE

The instant application is a divisional of U.S. patent application Ser. No. 12/624,663 filed Nov. 24, 2009.

BACKGROUND

The systems and techniques described include embodiments that relate to catalysts. They also include embodiments that relate to the making of catalysts and systems that may include catalysts.

Exhaust streams generated by the combustion of fossil fuels, such as in furnaces, ovens, and engines, contain various potentially undesirable combustion products including nitrogen oxides ($NO_x$), unburned hydrocarbons (HC), and carbon monoxide (CO). $NO_x$, though thermodynamically unstable, may not spontaneously decompose in the absence of a catalyst. Exhaust streams may employ exhaust treatment devices to remove $NO_x$ from the exhaust stream.

Examples of exhaust treatment devices include catalytic converters (e.g., three-way catalyst, oxidation catalysts, selective catalytic reduction (SCR) catalysts, and the like), evaporative emission devices, scrubbing devices (e.g., hydrocarbon (HC), sulfur, and the like), particulate filters/traps, adsorbers/absorbers, plasma reactors (e.g., non-thermal plasma reactors and thermal plasma reactors), and the like. A three-way catalyst (TWC catalyst) in a catalytic converter may reduce $NO_x$ by using CO and residual hydrocarbon. TWC catalysts may be effective over a specific operating range of both lean and rich fuel/air conditions and within a specific operating temperature range. Particulate catalytic compositions may enable optimization of the conversion of HC, CO, and $NO_x$. The conversion rate may depend on the exhaust gas temperature. The catalytic converter may operate at an elevated catalyst temperature of about 300 degrees Celsius or higher. The time period between when the exhaust emissions begin (i.e., "cold start"), until the time when the substrate heats up to a light-off temperature, is the light-off time. Light-off temperature is the catalyst temperature at which fifty percent (50%) of the emissions from the engine convert as they pass through the catalyst. Alternative methods to heat the catalyst may be employed to bring catalyst temperature to the light off temperature.

The exhaust gases from the engine may heat the catalytic converter. This heating may help bring the catalyst to the light-off temperature. The exhaust gases pass through the catalytic converter relatively unchanged until the light-off temperature is reached. In addition, the composition of the engine exhaust gas changes as the engine temperature increases from a cold start temperature to an operating temperature, and the TWC catalyst may work with the exhaust gas composition that is present at normal elevated engine operating temperatures.

Selective Catalytic Reduction (SCR) may include a noble metal system, base metal system, or zeolite system. The noble metal catalyst may operate in a temperature range of from about 240 degrees Celsius to about 270 degrees Celsius, but may be inhibited by the presence of sulfurdioxide. The base metal catalysts may operate in a temperature range of from about 310 degrees Celsius to about 500 degrees Celsius, but may promote oxidation of sulfurdioxide to sulfurtrioxide. The zeolites can withstand temperatures up to 600 degrees Celsius and, when impregnated with a base metal may have a wide range of operating temperatures.

SCR systems with ammonia as a reductant may yield $NO_x$ reduction efficiencies of more than 80 percent in large natural gas fired turbine engines and in lean burn diesel engines. However, the presence of ammonia may be undesirable, and there may be some ammonia slip due to imperfect distribution of reacting gases as well as due to incomplete ammonia consumption. Further, ammonia solutions require an extra storage tank and are subject to freezing at cold ambient temperatures.

SCR of $NO_x$ can also be accomplished with hydrocarbons. $NO_x$ can be selectively reduced by some organic compounds for example, alkanes, olefins, and alcohols, over several catalysts under excess oxygen conditions. The injection of diesel or methanol has been explored in heavy-duty stationary diesel engines to supplement the hydrocarbons (HC) in the exhaust stream. However, the conversion efficiency may be reduced outside the temperature range of 300 degrees Celsius to 400 degrees Celsius. In addition, this technique may have HC-slip over the catalyst, transportation and on-site bulk storage of hydrocarbons, and possible atmospheric release of the HC. The partial oxidation of hydrocarbons may release CO, unburned HC, and particulates.

It may be desirable to have a catalyst that can effect emission reduction across a range of temperatures and operating conditions that differ from those currently available.

BRIEF DESCRIPTION

In one embodiment, is provided a catalyst system. The catalyst system comprises a first catalytic composition comprising a homogeneous solid mixture containing at least one catalytic metal and at least one metal inorganic support. The pores of the solid mixture have an average diameter in a range of about 1 nanometer to about 15 nanometers. The catalytic metal comprises nanocrystals.

In another embodiment, is provided a catalyst system. The catalyst system comprises a first catalytic composition comprising a homogeneous solid mixture containing at least one catalytic metal and at least one metal inorganic support. The pores of the solid mixture have an average diameter in a range of about 1 nanometer to about 15 nanometers. The catalytic metal comprises nanocrystals. The catalyst system further comprises at least one promoting metal. The catalyst system also comprises a second catalytic composition. The second catalytic composition comprises (i) a zeolite, or (ii) a first catalytic material disposed on a first substrate. The first catalytic material comprises an element selected from the group consisting of tungsten, titanium, and vanadium.

In yet another embodiment is provided a method. The method comprises the steps of providing nanocrystals of at least one catalytic metal; incorporating the nanocrystals in at least one metal inorganic support; and forming a first catalytic composition comprising a homogeneous solid mixture containing at least one catalytic metal and at least one metal inorganic support; wherein the pores of the solid mixture have an average diameter in a range of about 1 nanometer to about 15 nanometers; and wherein the catalytic metal comprises nanocrystals.

In still yet another embodiment, is provided an exhaust system comprising a fuel delivery system configured to deliver a fuel to an engine; an exhaust stream path configured to receive an exhaust stream from the engine; a reductant delivery system configured to deliver a reductant to the exhaust stream path; and a catalyst system disposed in the exhaust stream path. The catalyst system comprises: a first catalytic composition comprising; a homogeneous solid mixture containing at least one catalytic metal and at least one metal inorganic support; wherein the pores of the solid mixture have an average diameter in a range of about 1 nanometer to about 15 nanometers; and wherein the catalytic metal is in the form of nanocrystals.

In still yet another embodiment, is provided a catalyst system comprising a first catalytic composition comprising a homogeneous solid mixture containing at least one catalytic metal and at least one metal inorganic support; wherein the pores of the solid mixture have an average diameter in a range of about 1 nanometer to about 15 nanometers; wherein the catalytic metal comprises nanocrystals; and wherein the nanocrystals have a particle size distribution of less than about 20 percent. The catalytic metal is present in an amount of equal or less than about 6 mole percent based on the weight of the homogenous solid mixture.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
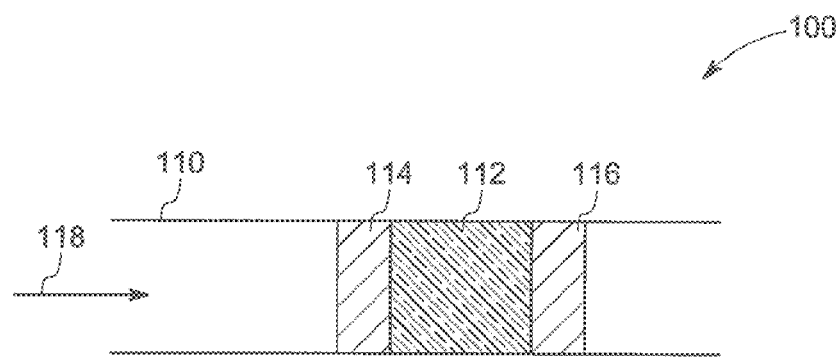
FIG. 1 is a schematic diagram depicting a catalyst system set-up in a furnace.

The systems and techniques described include embodiments that relate to catalysts and their use and manufacture. Other embodiments relate to articles that include catalysts and catalytic compositions that may chemically reduce $NO_x$ that is present in emissions generated during combustion, for example in furnaces, ovens, engines, and locomotives.

Embodiments of the invention described herein address the noted shortcomings of the state of the art. The catalyst system described herein fills the needs described above by employing a catalyst system comprising at least a first catalytic composition to reduce the $NO_x$ in an exhaust gas. The first catalytic composition uses a homogeneous solid mixture containing at least one catalytic metal and at least one metal inorganic support; wherein the pores of the solid mixture have an average diameter in a range of about 1 nanometer to about 15 nanometers; and wherein the catalytic metal comprises nanocrystals. The first catalytic composition converts the $NO_x$ in the exhaust gas to nitrogen containing chemicals such as ammonia. The catalyst system may further include a promoting metal. The catalyst system may further include a second catalytic composition. The second catalytic composition comprises either (i) a first catalytic material disposed on a first substrate or (ii) a zeolite, which may use the ammonia or ammonia like products generated by the first catalytic composition as a $NO_x$ reductant to further reduce additional $NO_x$ in the exhaust gas. In certain embodiments, the catalyst system may include a third catalytic composition comprising a second catalytic material disposed on a second substrate. The second catalytic material may be selected from the group consisting of platinum, palladium, ruthenium, osmium, and iridium. The catalyst systems described herein may further employ a hydrocarbon reductant, such as for example diesel. One advantage of using diesel as a reductant is that it is readily available on board vehicles with diesel engines. In certain embodiments, a co-reductant may be used with hydrocarbon reductant to lower the light off temperature of the catalyst.

A catalyst is a substance that can cause a change in the rate of a chemical reaction without itself being consumed in the reaction. A powder is a substance including finely divided solid particles. A monolith may be a ceramic block having a number of channels, and may be made by extrusion of clay, binders and additives that are pushed through a dye to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered tree of the modified term.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components unless otherwise stated. As used herein, the terms "disposed on" or "deposited over" or "disposed between" refers to both secured or disposed directly in contact with and indirectly by having intervening layers therebetween.

In one embodiment, is provided a catalyst system. The catalyst system comprises a homogeneous solid mixture containing at least one catalytic metal and at least one metal inorganic support. The pores of the solid mixture have an average diameter in a range of about 1 nanometer to about 15 nanometers. The catalytic metal comprises nanocrystals.

In one embodiment, the nanocrystals have a particle size distribution (PSD) of less than about 20 percent. In another embodiment, the nanocrystals have a PSD of less than about 15 percent. In yet another embodiment the nanocrystals have a PSD of less than about 10 percent. In one embodiment, the PSD may be determined using Transmission electron microscopy (TEM). TEM is a technique whereby a beam of electrons is transmitted through an ultra thin specimen, interacting with the specimen as it passes through. An image is formed from the interaction of the electrons transmitted through the specimen; the image is magnified and focused onto an imaging device, such as a fluorescent screen, on a layer of photographic film, or to be detected by a sensor such as a charge-coupled device (CCD) camera. TEMs are capable of imaging at a significantly higher resolution than light microscopes, owing to the small de Broglie wavelength of electrons. This enables the instrument's user to examine fine detail—even as small as a single column of atoms, which is tens of thousands times smaller than the smallest resolvable object in a light microscope, TEM forms a major analysis method in a range of scientific fields, in both physical and biological sciences. At smaller magnifications TEM image contrast is due to absorption of electrons in the material, due to the thickness and composition of the material. At higher magnifications complex wave interactions modulate the intensity of the image, requiring expert analysis of observed images. Alternate modes of use allow for the TEM to observe modulations in chemical identity, crystal orientation, electronic structure and sample induced electron phase shift as well as the regular absorption based imaging.

In one embodiment, the catalytic metal in the form of nanocrystals comprises transition metals. Suitable transition metals that may be used as the catalytic metal may include silver, platinum, gold, palladium, iron, nickel, cobalt, gallium, indium, ruthenium, rhodium, osmium, iridium, or combinations of at least two of the foregoing metals. In one embodiment, the catalytic metal comprises silver.

In one embodiment, the metal inorganic support forming the homogenous solid mixture has pores. The porous metal inorganic support is a reaction product of a reactive solution, a solvent, a modifier and a templating agent. A method includes mixing a reactive solution and a templating agent to form a gel; and calcining the gel to form a porous metal inorganic support that is capable of supporting a catalyst composition. In one embodiment, the metal inorganic support may be manufactured via a process, as described in co-pending US Patent Application 20090074641 which is incorporated herein in its entirety. As used herein, without further qualifiers, porous refers to a material containing pores with diameters in a range of from about 1 nanometer to about 15 nanometers. In one embodiment, the homogenous solid support comprising the metal inorganic support and the catalytic material in the form of nanocrystals may be manufactured in two steps. The first step described herein comprises the preparation of a solution comprising the catalytic material nanocrystals in a solvent. The second step comprises mixing the solution comprising the catalytic material nanocrystals in a solvent with a metal inorganic support precursor during the manufacturing process of the metal inorganic support, resulting in the formation of the homogenous solid mixture.

In one embodiment, the average pore size of the metal inorganic support is controlled and selected to reduce or eliminate poisoning. Poisoning may affect catalytic ability, and may be by aromatic species present in the reductant or in the exhaust gas stream. The porous material described herein is more resistant to poisoning from an aromatic containing reductant than a baseline typical gamma phase alumina impregnated with silver.

In various embodiments, the catalytic metal in the form of nanocrystals may be present in the first catalytic composition in an amount less than or equal to about 6 mole percent based on the weight of the homogenous solid mixture. One skilled in the art will appreciate that the amount selection may be based on end use parameters, economic considerations, desired efficacy, and the like. In one embodiment, the catalytic metal present in the first catalytic composition is in a range of from about 2 mole percent to about 6 mole percent based on the weight of the homogenous solid mixture. In another embodiment, the catalytic metal present in the first catalytic composition is in a range of from about 2.5 mole percent to about 4.5 mole percent based on the weight of the homogenous solid mixture. In yet another embodiment, the catalytic metal present in the first catalytic composition is in a range of from about 3 mole percent to about 4 mole percent based on the weight of the homogenous solid mixture.

In one embodiment, the metal inorganic support may include an inorganic material. As used herein, the phrase "metal inorganic support" means a support that comprises an inorganic material, which material in part contains atoms or cations of one or more of the metal elements. Suitable inorganic materials may include, for example, oxides, carbides, nitrides, hydroxides, carbonitrides, oxynitrides, borides, silicates, or borocarbides. In one embodiment, the inorganic oxide may have hydroxide coatings. In one embodiment, the inorganic oxide may be a metal oxide. The metal oxide may have a hydroxide coating. Other suitable metal inorganics may include one or more metal carbides, metal nitrides, metal hydroxides, metal carbonitrides, metal oxynitrides, metal borides, or metal borocarbides. Metal cations used in the foregoing inorganic materials can be transition metals, alkali metals, alkaline earth metals, rare earth metals, or the like. Other elements that form a part of the main group elements included aluminum, boron, and silicon.

Examples of suitable inorganic oxides include silica ($SiO_2$), alumina ($Al_2O_3$), titanic ($TiO_2$), zirconia ($ZrO_2$), ceria ($CeO_2$), maganesium oxide (MgO), barium oxide (BaO), yttrium oxide ($Y_2O_3$), vanadium oxide ($V_2O_5$), gallium oxide ($Ga_2O_3$), zinc oxide (ZnO), aluminosilicate ($Al_2SiO_5$), iron oxides (for example, FeO, beta-$Fe_2O_3$, gamma-$Fe_2O_3$, beta-$Fe_2O_3$, $Fe_3O_4$, or the like), calcium oxide (CaO), and manganese dioxide ($MnO_2$ and $Mn_3O_4$). Examples of suitable inorganic carbides include silicon carbide (SiC), titanium carbide (TiC), tantalum carbide (TaC), tungsten carbide (WC), hafnium carbide (HfC), or the like. Examples of suitable nitrides include silicon nitrides ($Si_3N_4$), titanium nitride (TiN), or the like. Examples of suitable borides include lanthanum boride ($LaB_6$), chromium borides (CrB and $CrB_2$), molybdenum borides ($MoB_2$, $Mo_2B_5$ and MoB), tungsten boride ($W_2B_5$), or the like. In one embodiment, the inorganic substrate is alumina. The alumina employed may be crystalline or amorphous. In one embodiment, the porous metal inorganic support comprises porous alumina and the catalytic metal comprises silver nanocrystals.

in one embodiment, the metal inorganic support has a mean pore size greater than about 0.5 nanometers. In one embodiment, the metal inorganic support may have an average diameter of pores in a range of about 1 nanometer to about 15 nanometers. In another embodiment, the metal inorganic support may have an average diameter of pores in a range of about 2 nanometers to about 12 nanometers. In yet another embodiment, the metal inorganic support may have an average diameter of pores in a range of about 3 nanometers to about 15 nanometers. In one embodiment, the metal inorganic support may have an average diameter of pores in a range of about 1 nanometer to about 5 nanometers. The average diameter of pores may be measured using nitrogen adsorption measurements with BET method. BET theory is a rule for the physical adsorption of gas molecules on a solid surface and serves as the basis for an important analysis technique for the measurement of the specific surface area of a material. BET is short hand for the inventors' names: Stephen Brunauer, Paul Hugh Emmett, and Edward Teller, who came up with the theory.

In certain embodiments, the pore size has a narrow monomodal distribution. In one embodiment, the pores have a pore size distribution polydispersity index that is less than about 1.5, less than about 1.3, or less than about 1.1. In one embodiment, the distribution of diameter sizes may be bimodal, or multimodal.

In another embodiment, the porous metal inorganic support includes one or more stabilizers, which may be added to the metal inorganic support. For example, in various embodiments, the metal inorganic support comprising predominantly alumina has smaller amounts of yttria, zirconia, or ceria added to it. In one embodiment, the amount of yttria, zirconia, or ceria is in a range of about 0.1 percent to about 10 percent based on the weight of the alumina. In another embodiment, the amount of yttria, zirconia, or ceria is in a range of about 1 percent to about 9 percent based on the weight of the alumina. In yet another embodiment, the amount of yttria, zirconia, or ceria is in a range of about 2 percent to about 6 percent based on the weight of the alumina.

In one embodiment, the pores may be distributed in a controlled and repeating fashion to form a pattern. In another embodiment, the pore arrangement is regular and not random. As defined herein, the phrase "pore arrangement is regular" means that the pores may be ordered and may have an average periodicity. The average pore spacing may be controlled and selected based on the surfactant selection that is used during the gelation. In one embodiment, the pores are unidirectional, are periodically spaced, and have an average periodicity. One porous metal inorganic support has pores that have a spacing of greater than about 200 nanometers. In one embodiment, the spacing is in a range of from about 300 nanometers to about 400 nanometers. In another embodiment, the spacing is in a range of from about 500 nanometers to about 2000 nanometers. In yet another embodiment, the spacing is in a range of from about 600 nanometers to about 1500 nanometers. The average pore spacing (periodicity) may be measured using small angle X-ray scattering. In another embodiment, the pore spacing is random.

The porous metal inorganic support may have a surface area greater than about 50 square meters per gram. In one embodiment, the porous metal inorganic support has a surface area that is in a range of from about 50 square meters per gram to about 2000 square meters per gram. In another embodiment, the porous metal inorganic support has a surface area that is in a range of from about 100 square meters per gram to about 1000 square meters per gram. In one embodiment, the porous metal inorganic support has a surface area that is in a range of from about 300 square meters per gram to about 600 square meters per gram The porous metal oxide inorganic support may be made up of particles. The particles may be agglomerates, a sintered mass, a surface coating on a support, or the like. The porous metal oxide inorganic support may have an average particle size of up to about 4 millimeters. In one embodiment, the porous inorganic materials may have an average particle size in a range of from about 5 micrometers to about 3 millimeters. In another embodiment, the porous inorganic materials may have an average particle size in a range of from about 500 micrometers to about 2.5 millimeters. In yet another embodiment, the porous inorganic materials may have an average particle size in a range of from about 1 millimeter to about 2 millimeters. In one, the porous substrate has an average particle size of about 40 micrometers. In one, the porous substrate has an average particle size of about 10 micrometers.

The first catalytic composition may be present in an amount of up to about 90 weight percent, based upon the total weight of the catalyst system. In one embodiment, the first catalytic composition may be present in an amount in a range of from about 1 weight percent to about 90 weight percent, based upon the total weight of the catalyst system. In another embodiment, the first catalytic composition in the form of a bed may be present in an amount in a range of from about 20 weight percent to about 80 weight percent, based upon the total weight of the catalyst system. In yet another embodiment the first catalytic composition may be present in an amount in a range of from about 50 weight percent to about 70 weight percent, based upon the total weight of the catalyst system. In various embodiments, the ratio is determined by the quantity of species generated on the first bed that are utilized on the second bed. This will depend on several variables specific to the particular exhaust application where the catalyst system may be employed. The type of engine or turbine, the exhaust temperature, the flow rate, concentration of $NO_x$, etc. all factor into determining the ratio of the first catalytic composition to the second catalytic composition. The ratio can be optimized for a particular application in a way such as to achieve the highest $NO_x$ conversion in a given system.

In one embodiment, the first catalytic composition comprises at least one promoting metal. A promoting metal is a metal that enhances the action of a catalyst. In one embodiment, the promoting metal may be selected from the group consisting of gallium, indium, gold, vanadium, zinc, tin, bismuth, cobalt, molybdenum, zirconium, hafnium, and tungsten. In one embodiment, the promoting metal may be present in an amount in a range of from about 0.1 weight percent to about 20 weight percent, based upon the total weight of the catalyst system. In another embodiment, the first catalytic composition may be present in an amount in a range of from about 0.5 weight percent to about 15 weight percent, based upon the total weight of the catalyst system. In yet another embodiment, the first catalytic composition may be present in an amount in a range of from about 1 weight percent to about 12 weight percent, based upon the total weight of the catalyst system.

In one embodiment, the first catalytic composition may be assembled in the catalyst system as shown in FIG. 1. Referring to FIG. 1, a catalyst system 100 for determining the $NO_x$ reducing capabilities of the first catalytic composition is provided. The first catalytic composition 112 is placed in a quartz tube 110 having an outer diameter of one inch. The first catalytic composition 112 is placed inside the quartz tube between two plugs of quartz wool 114 and 116. The quartz tube 110 may now be used in an exhaust system to help minimize the $NO_x$ emissions.

In one embodiment, the catalyst system may further comprise a second catalytic composition. In one embodiment, the first catalytic material of the second catalytic composition may include a zeolite. The function of the first catalytic material includes the use of ammonia or ammonia like products generated by the first catalytic composition as a $NO_x$ reductant to further reduce additional $NO_x$ in the exhaust gas. In one embodiment, the zeolite is free of additional metals, i.e., the aluminum and silicon metal ions in the zeolite are not exchanged with any other metal ions, for example, iron or copper ions. The zeolites may be naturally occurring or synthetic. Examples of suitable zeolites are zeolite Y, zeolite beta, ferrierite, mordenite, ZSM-5, ZSM-12, ZSM-22, ZSM-23, ZSM-34, ZSM-35, ZSM-38, ZSM-48, ZSM-50, ZSM-57, zeolite A, zeolite X, or a combination comprising at least two of the foregoing zeolites. In one embodiment, the first catalytic material consists essentially of ferrierite. An exemplary zeolite is a ferrierite having a silicon-to-aluminum ratio of from about 10 to about 30. In another embodiment, the ferrierite has a silicon-to-aluminum ratio of from about 12 to about 25. In yet another embodiment, the ferrierite has a silicon-to-aluminum ratio of from about 15 to about 20. In one embodiment, the zeolite includes additional metals, i.e., the aluminum and silicon metal ions in the zeolite are exchanged with any other metal ions, for example, iron or copper ions. Examples of such ion-exchanged zeolites include iron zeolite and copper zeolite.

Examples of commercially available zeolites that may be used in the second catalytic composition are marketed under the following trademarks: CBV100, CBV300, CBV400; CBV500, CBV600, CBV712, CBV720, CBV760, CBV780, CBV901, CP814E, CP814C, CP811C-300, CP914, CP914C, CBV2314, CBV3024E, CBV5524G, CBV8014, CBV28014, CBV10A, CBV21A, CBV90A, or the like, or a combination including at least two of the foregoing commercially available zeolites.

The zeolite particles may be in the form of extrudates and generally have an average particle size of up to about 2 millimeters. In one embodiment, the zeolite particles have an average particle size of from about 0.001 millimeters to about 1.1 millimeters. In another embodiment, the zeolite particles have an average particle size of from about 0.1 millimeters to about 0.9 millimeters. In yet another embodiment, the zeolite particles have an average particle size of from about 0.2 millimeters to about 0.8 millimeters. In an exemplary embodiment, the zeolite particles have an average particle size of about 0.001 millimeter.

The zeolite particles may have a surface area of up to about 600 square meters per gram. In one embodiment, the zeolite particles may have a surface area in a range of from about 50 square meters per gram to about 600 square meters per gram. In another embodiment, the zeolite particles may have a surface area in a range of from about 80 square meters per gram to about 500 square meters per gram. In yet another embodiment, the zeolite particles may have a surface area in a range of from about 100 square meters per gram to about 400 square meters per gram. A high specific surface area typically results in more efficient conversion in addition to other factors including unit cell sizes, pore sizes, type of catalytic material, and exchanged metals.

In another embodiment, the second catalytic composition includes a first catalytic material disposed upon a first substrate. Suitable materials that may be employed as the first substrate include the inorganic materials described above for the metal inorganic support. The first catalytic material may include an element selected from the group consisting of tungsten, titanium, and vanadium.

The first catalytic material may be present in the second catalytic composition in an amount up to about 50 mole percent based on the amount of the catalyst system. In one embodiment, the first catalytic material is present in the second catalytic composition in an amount in a range of from about 0.025 mole percent to about 50 mole percent based on the amount of the catalyst system. In another embodiment, the first catalytic material is present in the second catalytic composition in an amount in a range of from about 0.5 mole percent to about 40 mole percent based on the amount of the catalyst system. In yet another embodiment, the first catalytic material is present in the second catalytic composition in an amount in a range of from about 1.0 mole percent to about 30 mole percent based on the amount of the catalyst system. In one embodiment, the amount of first catalytic material in the second catalytic composition is about 1.5 mole percent based on the amount of the catalyst system. In another embodiment, the amount of first catalytic material in the second catalytic composition is about 5 mole percent based on the amount of the catalyst system.

The second catalytic composition may be used in an amount of up to about 80 weight percent, based upon the total weight of the catalyst system. In one embodiment, the second catalytic composition may be used in an amount in a range of from about 20 weight percent to about 70 weight percent based upon the total weight of the catalyst system. In another embodiment, the second catalytic composition may be used in an amount in a range of from about 30 weight percent to about 60 weight percent based upon the total weight of the catalyst system. In yet another embodiment, the second catalytic composition may be used in an amount in a range of from about 40 weight percent to about 50 weight percent based upon the total weight of the catalyst system. Also the first catalytic material may be present in the second catalytic composition in an amount selected from the same range amount of the catalytic material in the metal inorganic support as described for the first catalytic composition above.

Figure 2:
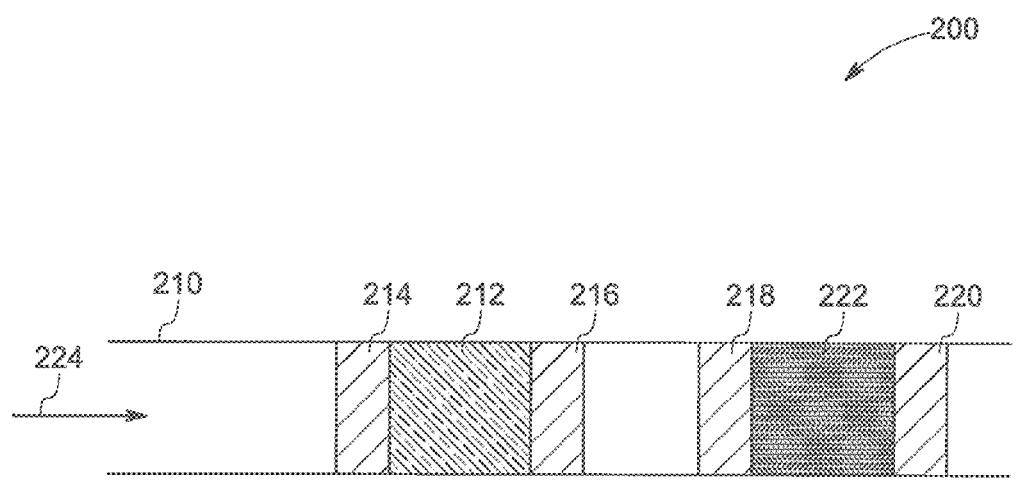
FIG. 2 is a schematic diagram depicting a catalyst system set-up in a furnace.

In one embodiment, the catalyst system comprising the first catalytic composition and the second catalytic composition may be assembled in a dual bed configuration in the catalyst system as shown in FIG. 2. Referring to FIG. 2, a catalyst system 200 for determining the $NO_x$ reducing capabilities of the first catalytic composition is provided. The first catalytic composition 212 is placed in a quartz tube 210 having an outer diameter of one inch. The first catalytic composition 212 is placed inside the quartz tube between two plugs of quartz wool 214 and 216. The second catalytic composition 222 was similarly placed between another set of quartz wool 218 and 220 about an inch away from the first set of quartz wool. The quartz tube 210 may now be used in an exhaust system to help minimize the $NO_x$ emissions.

In one embodiment, the catalyst system further comprises a third catalytic composition disposed downstream from the second catalytic composition; the third catalytic composition comprising a second catalytic material disposed on a second substrate, wherein the second catalytic material is selected from the group consisting of platinum, palladium, ruthenium, rhodium, osmium, and iridium. Suitable materials that may be employed as the second substrate include the inorganic materials described above for the metal inorganic support. The second catalytic material is typically used to oxidize any unwanted products of reaction or unused reactants or reductants.

In one embodiment, the third catalytic composition is a diesel oxidation catalyst (DOC). A DOC is a flow through device that consists of a canister containing a honeycomb-like structure or substrate. The second substrate has a large surface area that is coated with an active catalyst layer. This layer contains a small, well dispersed amount of precious metals such as platinum or palladium. As the exhaust gases traverse the DOC, carbon monoxide, gaseous hydrocarbons and liquid hydrocarbon particles (unburned fuel and oil) are oxidized, thereby reducing harmful emissions.

The second catalytic material may be present in the third catalytic composition in an amount up to about 50 mole percent. In one embodiment, the second catalytic material is present in the third catalytic composition in an amount in a range of from about 0.025 mole percent to about 50 mole percent. In another embodiment, the second catalytic material is present in the third catalytic composition in an amount in a range of from about 0.5 mole percent to about 40 mole percent. In yet another embodiment, the second catalytic material is present in the third catalytic composition in an amount in a range of from about 1.0 mole percent to about 30 mole percent. In one embodiment, the amount of second catalytic material in the third catalytic composition is about 1.5 mole percent. In another embodiment, the amount of second catalytic material in the third catalytic composition is about 5 mole percent.

The third catalytic composition may be used in an amount of up to about 90 weight percent, based upon the total weight of the catalyst system. In one embodiment, the third catalytic composition may be used in an amount in a range of from about 10 weight percent to about 80 weight percent based upon the total weight of the catalyst system. In another embodiment, the third catalytic composition may be used in an amount in a range of from about 20 weight percent to about 70 weight percent based upon the total weight of the catalyst system. In yet another embodiment, the third catalytic composition may be used in an amount in a range of from about 30 weight percent to about 60 weight percent based upon the total weight of the catalyst system.

In one embodiment, the second substrate may include an inorganic material. In one embodiment, the inorganic materials may include the materials listed above for the metal inorganic support. Suitable materials that may be employed as the second substrate include at least one member selected from the group consisting of alumina, titania, zirconia, ceria, silicon carbide and mixtures thereof.

Figure 3:
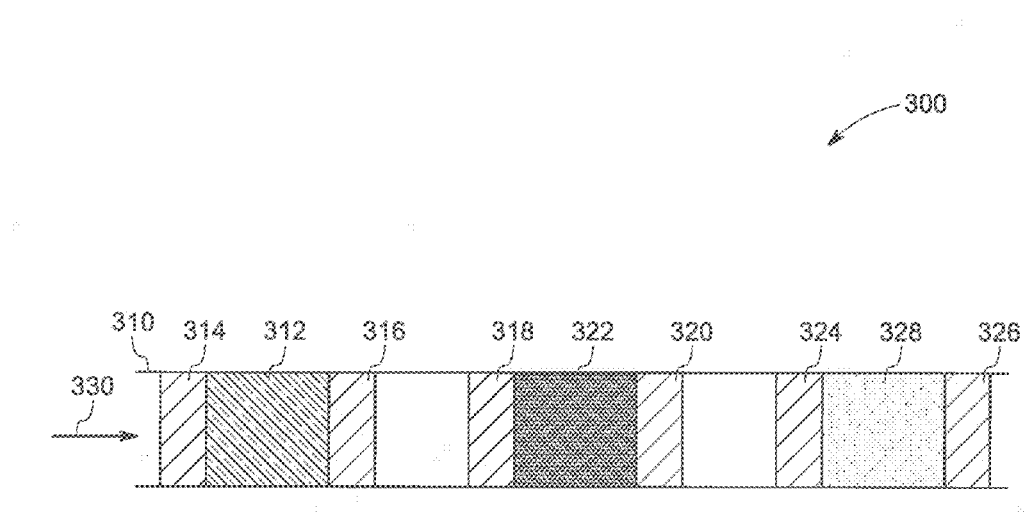
FIG. 3 is a schematic diagram depicting a catalyst system set-up in a furnace.

In one embodiment, the catalyst system comprising the first catalytic composition, the second catalytic composition and the third catalytic composition may be assembled in a triple bed configuration in the catalyst system as shown in FIG. 3. Referring to FIG. 3, a catalyst system 300 for determining the $NO_x$ reducing capabilities of the first catalytic composition is provided. The first catalytic composition 312 is placed in a quartz tube 310 having an outer diameter of one inch. The first catalytic composition 312 is placed inside the quartz tube between two plugs of quartz wool 314 and 316. The second catalytic composition 322 is similarly placed between another set of quartz wool 318 and 320 about an inch away from the first set of quartz wool. The third catalytic composition 328 is similarly placed between another set of quartz wool 324 and 326 about an inch away from the first set of quartz wool. The quartz tube 310 may now be used in an exhaust system to help minimize the $NO_x$ emissions.

In one embodiment, the catalyst system further comprises a delivery system configured to deliver a reductant. When the catalytic composition is employed to reduce $NO_x$ generated in emissions from furnaces, ovens, locomotives and engines, a variety of hydrocarbons may be effectively used as a reductant. In one embodiment, the reductant is a hydrocarbon. In one embodiment, the hydrocarbon has an average carbon chain length in the range of about 2 carbon atoms to about 24 carbon atoms. In one embodiment, the reductant is one or more of diesel, ultra-low sulfur diesel (ULSD), ethanol, gasoline, and octane. In one embodiment, the reductant is a hydrocarbon having an average carbon chain length in the range of about 3 carbon atoms or less. In one embodiment, the reductant is one or more of methane, ethylene, and propylene. In one embodiment, the reductant is an oxygenated hydrocarbon. In one embodiment, the oxygenated hydrocarbon is ethanol.

In certain embodiments, a co-reductant may be used with hydrocarbon reductant to lower the light off temperature of the catalyst. In one embodiment, the co-reductant is hydrogen, in one embodiment, the amount of co-reductant employed may be in a range of from about 0 parts per million to about 4000 parts per million based on the total volumetric flow rate of the exhaust. In another embodiment, the amount of co-reductant employed may be in a range of from about 10 parts per million to about 3000 parts per million based on the total volumetric flow rate of the exhaust. In yet another embodiment, the amount of co-reductant employed may be in a range of from about 20 parts per million to about 2000 parts per million based on the total volumetric flow rate of the exhaust. In one embodiment, the amount of co-reductant employed may be in a range of from about 0 parts per million to about 1000 parts per million based on the total volumetric flow rate of the exhaust.

In an exemplary embodiment, diesel can be used as a reductant. The catalytic composition can reduce $NO_x$ while using higher hydrocarbons having from about 5 to about 9 carbon atoms per molecule as a reductant. The catalyst system advantageously functions across a variety of temperature ranges. Suitable temperature ranges may include temperatures of greater than about 325 degrees Celsius. Other temperature ranges may include those up to about 425 degrees Celsius.

In another embodiment, is provided a catalyst system. The catalyst system comprises a first catalytic composition comprising a homogeneous solid mixture containing at least one catalytic metal and at least one metal inorganic support. The pores of the solid mixture have an average diameter in a range of about 1 nanometer to about 15 nanometers. The catalytic metal comprises nanocrystals. The catalyst system further comprises at least one promoting metal. The catalyst system also comprises a second catalytic composition. The second catalytic composition comprises (i) a zeolite, or (ii) a first catalytic material disposed on a first substrate. The first catalytic material comprises an element selected from the group consisting of tungsten, titanium, and vanadium.

In yet another embodiment is provided a method. The method comprises the steps of providing nanocrystals of at least one catalytic metal; incorporating the nanocrystals in at least one metal inorganic support; and forming a first catalytic composition comprising a homogeneous solid mixture containing at least one catalytic metal and at least one metal inorganic support; wherein the pores of the solid mixture have an average diameter in a range of about 1 nanometer to about 15 nanometers; and wherein the catalytic metal comprises nanocrystals.

In one embodiment, providing nanocrystals of the at least one catalytic metal comprises preparing the nanocrystals of the catalytic metal in the presence of a surfactant. As used herein the term "surfactant" refers to a surface active agent. Surface active agents are usually organic compounds that are amphiphilic, meaning they contain both hydrophobic groups (their "tails") and hydrophilic groups (their "heads"). Therefore they may be soluble in either water or in organic solvents depending on the configuration. The use of surfactants restrains the growth of the silver nanocrystals thereby resulting in a substantially uniform and controlled size of the nanocrystals. In one embodiment, the surfactant employed may include carboxylic acids with about 17 carbon-carbon bonds. In one embodiment, the surfactant employed may be selected from one or more of oleic acid, octanoic acid, lauric acid, and stearic acid. One skilled in the art will appreciate, that any surfactant known in the art, that will provide the desired nanocrystals may be employed.

In one embodiment, providing nanocrystals of the catalytic metal is carried out a temperature in a range of about 10 degrees Celsius to about 200 degrees Celsius. In another embodiment, providing nanocrystals of the catalytic metal is carried out a temperature in a range of about 50 degrees Celsius to about 150 degrees Celsius. In yet another embodiment, providing nanocrystals of the catalytic metal is carried out a temperature in a range of about 60 degrees Celsius to about 120 degrees Celsius.

In one embodiment, providing nanocrystals of the catalytic metal is carried out under vacuum in a range of about 0.5 millimeter of mercury to about 10 millimeter of mercury. In another embodiment, providing nanocrystals of the catalytic metal is carried out under vacuum in a range of about 0.8 millimeter of mercury to about 8 millimeter of mercury. In yet another embodiment, providing nanocrystals of the catalytic metal is carried out under vacuum in a range of about 1 millimeter of mercury to about 5 millimeter of mercury.

In one embodiment, the nanocrystals have a PSD of less than about 20 percent. In another embodiment, the nanocrystals have a PSD of less than about 15 percent. In yet another embodiment the nanocrystals have a PSD of less than about 10 percent.

In one embodiment, the step of providing the nanocrystals of the catalytic metal includes forming a mixture of a salt of the catalytic metal with a surfactant and a high boiling solvent. The resultant mixture is heated to dissolve the salt of the catalytic metal in the solvent. The mixture is heated under vacuum so that, any moisture present in the system, for example, water present as an impurity in the reaction materials, is removed using the vacuum. Typically a vacuum in a range of about 0.5 millimeters to about 10 millimeters of mercury may be employed. The salt of the catalytic metal dissolves in the solvent and subsequently forms the nanocrystals.

As used herein the term "nanocrystals" means nanomaterials with at least one dimension of less than or equal to about 100 nanometers. Nanocrystals attract huge technological interest since many of their electrical and thermodynamic properties show strong size dependence and can therefore be controlled through careful manufacturing processes. The synthesis of the nanocrystals under vacuum and in the presence of a surfactant has certain advantages. The salt of the catalytic metal is decomposed under vacuum. Typically, as is known in the art, presence of water may impair the monodispersity of the metal. By employing vacuum the water present or formed in the reaction mixture is removed thereby minimizing the side-effects that occur in the presence of water. Further, introduction of a surfactant into the synthesis effectively "protects" or controls the growth of the metal nanocrystals. Therefore, the metal particles prepared by this method have a size in the nano-region and their PSD may be less than about 20 percent.

in one embodiment, the solvent employed may include an organic solvent having a boiling point greater than or equal to 90 degrees Celsius and can also dissolve the salt of the catalytic metal. In one embodiment, the solvent employed may include an amine solvent having 8 to 40 carbon atoms. Suitable examples of solvents may include one or more of trioctylamine, octylamine, and hexadecylamine.

In one embodiment, the solvent added to the solution before filtering or centrifuging may include a polar solvent selected from ethanol, methanol, and acetone. In one embodiment, the solvent employed before centrifuging is ethanol. In one embodiment, the solvent added after the centrifuging may include any non-polar solvent selected from hexane, chloroform, tetrahydrofuran, and toluene. In one embodiment, the solvent employed after centrifuging is hexane.

In one embodiment, the temperature at which the dissolution of the salt of the catalytic metal in the solvent in the presence of a surfactant is carried out is in a range of about 10 degrees Celsius to about 90 degrees Celsius. In another embodiment, the temperature is about 60 degrees Celsius to about 80 degrees Celsius. In one embodiment, the temperature at which the reaction mixture is maintained after the dissolution of the salt of the catalytic metal in the solvent is in a range of about 60 degrees Celsius to about 120 degrees Celsius. In another embodiment, the temperature is about 65 degrees Celsius to about 100 degrees Celsius. In yet another embodiment, the temperature is about 85 degrees Celsius to about 90 degrees Celsius. In one embodiment, the time for which the reaction mixture is maintained after the dissolution of the salt of the catalytic metal in the solvent is in a range of about 0.5 hours to about 5 hours. In another embodiment, the time for which the reaction mixture is maintained is in a range of about 1 hour to about 4 hours. In yet another embodiment, the time for which the reaction mixture is maintained is in a range of about 2 hours to about 3 hours. In one embodiment, the amount of solvent that may be added before centrifuging may be above 1 milliliter. In another embodiment, the amount of the solvent may be in a range of about 10 milliliters to about 50 milliliters. In yet another embodiment, the amount of the solvent may be in a range of about 20 milliliters to about 45 milliliters. In various embodiments, depending on the speed of centrifuge, the time of centrifuge may be in a range of from about 1 minute to about one hour.

In a method of using the catalyst system, the catalyst system is disposed in the exhaust stream of an internal combustion engine. The internal combustion engine may be part of any of a variety of mobile or fixed assets, for example, an automobile, locomotive, or power generator. Because different engines have different combustion characteristics, the exhaust stream components differ from one system to another. Such differences may include variations in $NO_x$ levels, presence of sulfur, and the presence or quantity of other species of reaction product. Changes in the operating parameters of the engine may also alter the exhaust flow characteristics. Examples of differing operating parameters may include temperature and flow rate. The catalyst may be used to reduce $NO_x$ to nitrogen and oxygen at a desirable rate and at a desirable temperature appropriate for the given system and operating parameters. The catalyst system may be disposed in the exhaust gas path in any of a variety of ways, for example, in powdered form, in the form of an extruded monolith, or as a washcoated substrate. Various techniques for creating such powder beds, extrudates, or coated substrates are known in the art, and may be applied as appropriate for the desired composition and catalyst form. Further, each of the catalytic compositions may be supported separately or on the same support. They could even overlap or be partially mixed. For example, the catalyst systems 100, 200, 300 described in FIGS. 1, 2 and 3 above may be disposed in the exhaust path to minimize the $NO_x$ emissions.

During operation, the catalyst system can convert the $NO_x$ present in an exhaust stream by about 90 weight percent. In one embodiment, the catalyst system provides $NO_x$ conversion of at least about 40 percent based on the initial amount of $NO_x$ at a temperature of about 275 degrees Celsius to about 425 degrees Celsius. In another embodiment, the catalyst system provides a $NO_x$ conversion of about 45 percent to about 90 percent based on the initial amount of $NO_x$ at a temperature of about 275 degrees Celsius to about 425 degrees Celsius. In yet another embodiment, the catalyst system provides a $NO_x$ conversion of about 55 percent to about 80 percent based on the initial amount of $NO_x$ at a temperature of about 275 degrees Celsius to about 425 degrees Celsius. In yet still another embodiment, the catalyst system provides a $NO_x$ conversion of about 50 percent to about 70 percent based on the initial amount of NO, at a temperature of about 275 degrees Celsius to about 425 degrees Celsius. In one embodiment, the catalyst system provides a $NO_x$ conversion of about 40 percent to about 70 percent based on the initial amount of $NO_x$ at a temperature of about 325 degrees Celsius to about 375 degrees Celsius.

In still yet another embodiment, is provided an exhaust system comprising a fuel delivery system configured to deliver a fuel to an engine; an exhaust stream path configured to receive an exhaust stream from the engine; a reductant delivery system configured to deliver a reductant to the exhaust stream path; and a catalyst system disposed in the exhaust stream path. The catalyst system comprises: a first catalytic composition comprising; a homogeneous solid mixture containing at least one catalytic metal and at least one metal inorganic support; wherein the pores of the solid mixture have an average diameter in a range of about 1 nanometer to about 15 nanometers; and wherein the catalytic metal is in the form of nanocrystals.

Figure 4:
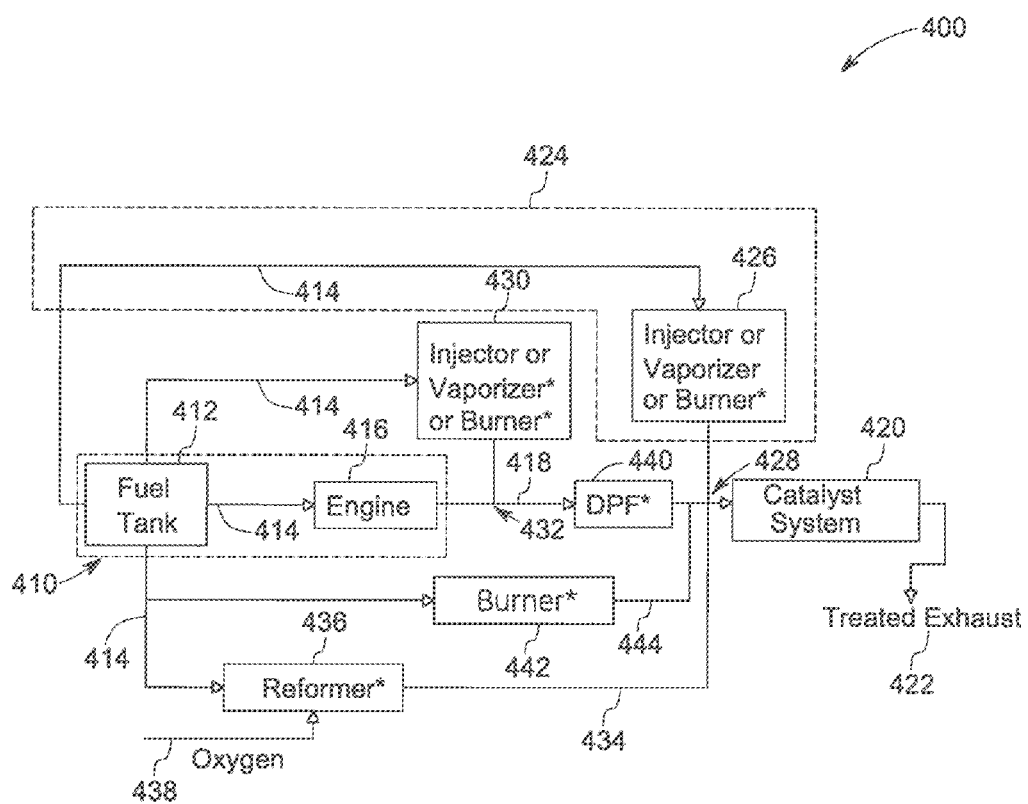
FIG. 4 is a schematic diagram depicting an exhaust system comprising the catalyst system set-up in accordance with an embodiment of the invention.

Referring to FIG. 4, an exhaust system 400 capable of reducing $NO_x$ is provided. The exhaust system 400 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system 410 may also comprise a reductant delivery system 424 configured to deliver a reductant. In one embodiment, the reductant is the fuel 414. In one embodiment, the reductant comprising the fuel 414 is directly delivered to the catalyst system 420 from the fuel tank 412 via an injector or vaporizer or burner 426 through the point of injection 428. In one embodiment, a portion of the fuel 414 may be delivered to the catalyst system 420 by the exhaust stream 418 from the fuel tank 412 via an injector or vaporizer or burner 430 through the point of injection 432. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 428. In one embodiment, a diesel particulate filter DPF 440 is located between the engine 416 and the catalyst system 420 before the point of injection 428. In this embodiment, the reductant comprising the fuel 414 and the co-reductant 434 are delivered to the catalyst system 420 through the point of injection 428 after the exhaust stream 418 is passed through the DPF 440. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 420 has a temperature which is below the optimum operating conditions of the catalyst system 422. In this embodiment, the output of the burner 444 may be located between the DPF 440 and the point of injection 428 of the reductant comprising the fuel 414 and the co-reductant 434 in the exhaust stream 418.

In an exemplary embodiment as shown in FIG. 4, the fuel may comprise ULSD. In certain embodiments as shown in FIG. 4, the reductant comprises the fuel. In certain embodiments wherein the reductant is not the same as the fuel, a separate reductant tank can be used to contain the reductant as will be explained in the description of figures provided below. In embodiments, where the reductant is not the fuel, the reductants may include ethanol, gasoline, mixture of ethanol and gasoline, and mixture of ethanol and diesel. The engine 416 can be any form of internal combustion engine, which produces exhaust (reciprocating or rotating) and can operate on a variety of fuel sources including gas, biodiesel, diesel, and natural gas. The DPF is an optional equipment that may be located up stream of the catalyst system as shown in FIG. 4 or down-stream as will be explained in the figure descriptions given below. The purpose of the filter is to remove particulate mater (soot and ash) from the exhaust stream. In certain embodiments (not shown in figure), the DPF may be paired with a diesel injector to regenerate the DPF by burning off soot. The burner as described above burns diesel fuel to increase the temperature of the exhaust stream which can be used to improve the performance of the catalyst in situation where the exhaust temperature is below the optimum operating conditions of the catalyst. The burner is placed upstream of the diesel and the reformer injection which is just before the catalyst system. In the case where DPF is upstream of the catalyst system the burner may be upstream or downstream of DPF. The reformer generates the co-reductant hydrogen from the diesel fuel and oxygen source (most likely from air). Carbon monoxide, carbon dioxide and water, can also be generated in the reforming process. The reformer may also perform water gas shift reaction to increase yield of hydrogen. The injector or vaporizer or burner is the means by which the reductant, for example, diesel fuel, is delivered to the catalyst. The reductant can either be vaporized and delivered as a gas stream or be atomized or sprayed into the exhaust (or onto the catalyst system) with an injector. The catalyst system 420 may include the catalyst system configurations described herein in the example section. Additionally the exhaust system may include other equipments such as pumps, valves, sensors, control loops, computers (control logic), storage tanks, mixers (gas or liquid), insulation, flow paths, separators, etc. as would be appreciated by one skilled in the art.

Figure 5:
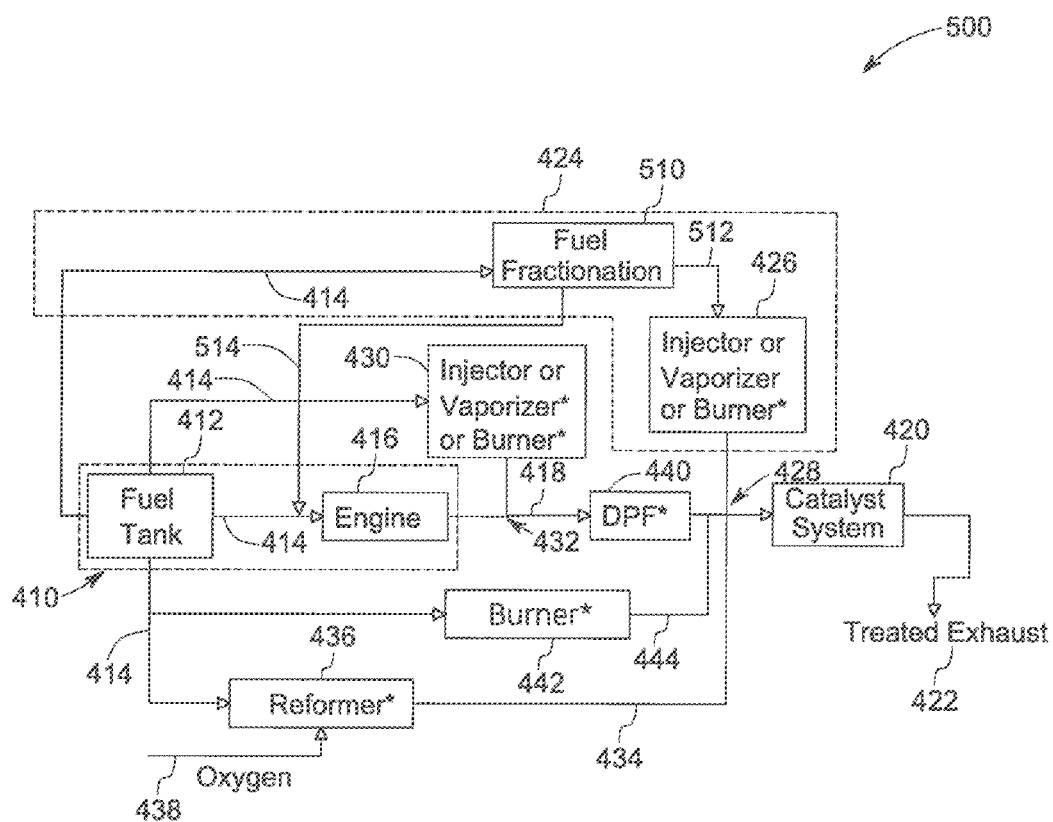
FIG. 5 is a schematic diagram depicting an exhaust system comprising the catalyst system set-up in accordance with an embodiment of the invention.

Referring to FIG. 5, an exhaust system 500 capable of reducing $NO_x$ is provided. The exhaust system 500 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system 410 may also comprise a reductant delivery system 424 configured to deliver a reductant. The reductant delivery system 424 comprises a fuel fractionator 510 and an injector or vaporizer or burner 426. In one embodiment, the reductant comprising the fuel 414 is first passed through the fuel fractionator 510 to provide a light fuel fraction 512 and a heavy fuel fraction 514. The light fuel fraction 512 comprises hydrocarbons having an average carbon chain length of less than about 12 carbons and the heavy fuel fraction 514 comprises hydrocarbons having an average carbon chain length of greater than about 12 carbons. The light fuel fraction 512 is delivered to the catalyst system 420 from the fuel tank 412 via an injector or vaporizer or burner 426 through the point of injection 428. In one embodiment, a portion of the fuel 414 may be delivered to the catalyst system 420 by the exhaust stream 418 from the fuel tank 412 via an injector or vaporizer or burner 430 through the point of injection 432. The heavy fuel fraction 514 is delivered to the engine 416 through the fuel 414. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 428. In one embodiment, a DPF 440 is located between the engine 416 and the catalyst system 420 before the point of injection 428. In this embodiment, the reductant comprising the light fuel fraction 512 and the co-reductant 434 are delivered to the catalyst system 420 after the exhaust stream 418 is passed through the DPF 440 through the point of injection 428. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 may be located between the DPF 440 and the point of injection 428 of the reductant comprising the light fuel fraction 512 and the co-reductant 434 in the exhaust stream 418.

Figure 6:
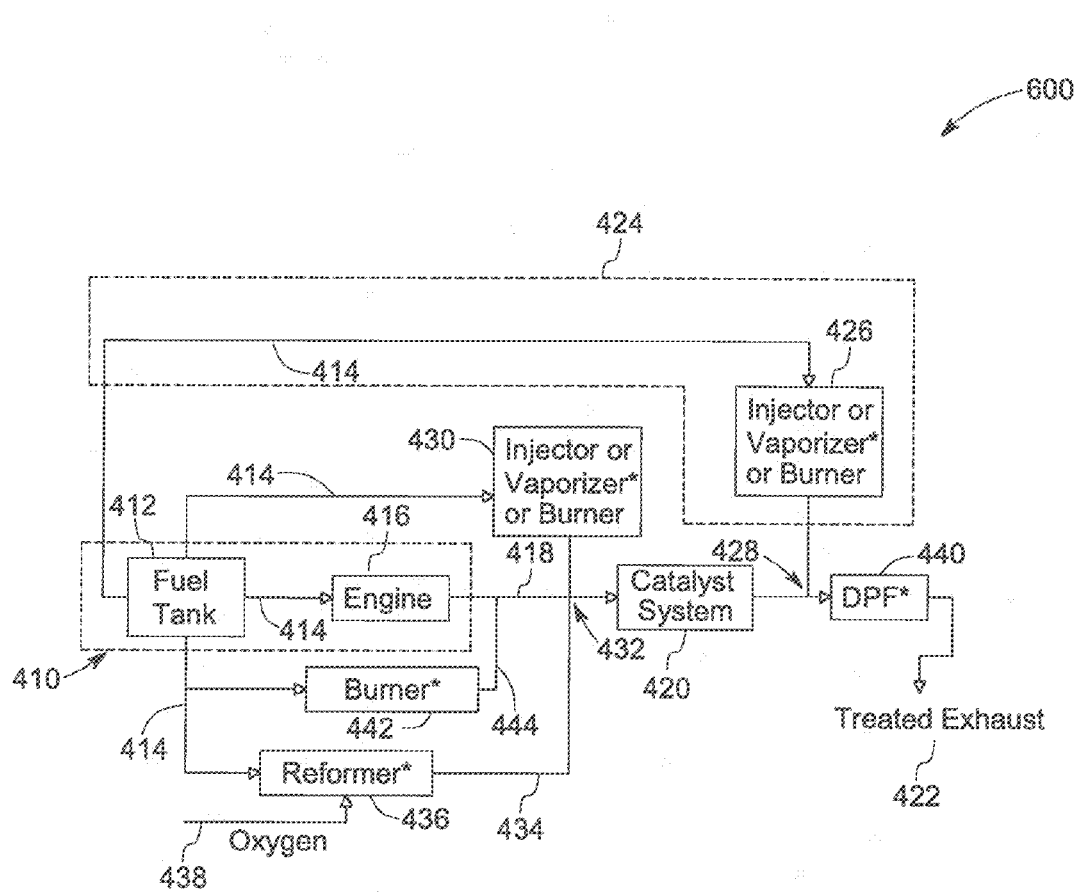
FIG. 6 is a schematic diagram depicting an exhaust system comprising the catalyst system setup in accordance with an embodiment of the invention.

Referring to FIG. 6, an exhaust system 600 capable of reducing $NO_x$ is provided. The exhaust system 600 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system may also comprise a reductant delivery system 424 configured to deliver a reductant. In one embodiment, the reductant is the fuel 414. In one embodiment, the reductant comprising the fuel 414 is directly delivered to the catalyst system 420 from the fuel tank 412 via an injector or vaporizer or burner 426 through the point of injection 428. In one embodiment, a portion of the fuel 414 may be delivered to the catalyst system 420 by the exhaust stream 418 from the fuel tank 412 via an injector or vaporizer or burner 430 through the point of injection 432. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 432. In one embodiment, a DPF 440 is located after the catalyst system 420 and the exhaust stream 418 is passed through the catalyst system 420 and the DPF 440 before exiting as the treated exhaust stream 422. In this embodiment, the reductant comprising the fuel 414 is delivered to the exhaust stream 418 through the point of injection 428. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 is connected in the exhaust stream between the engine 418 and the point of injection 432 of the reductant comprising the fuel 414 and the co-reductant 434 in the exhaust stream 418.

Figure 7:
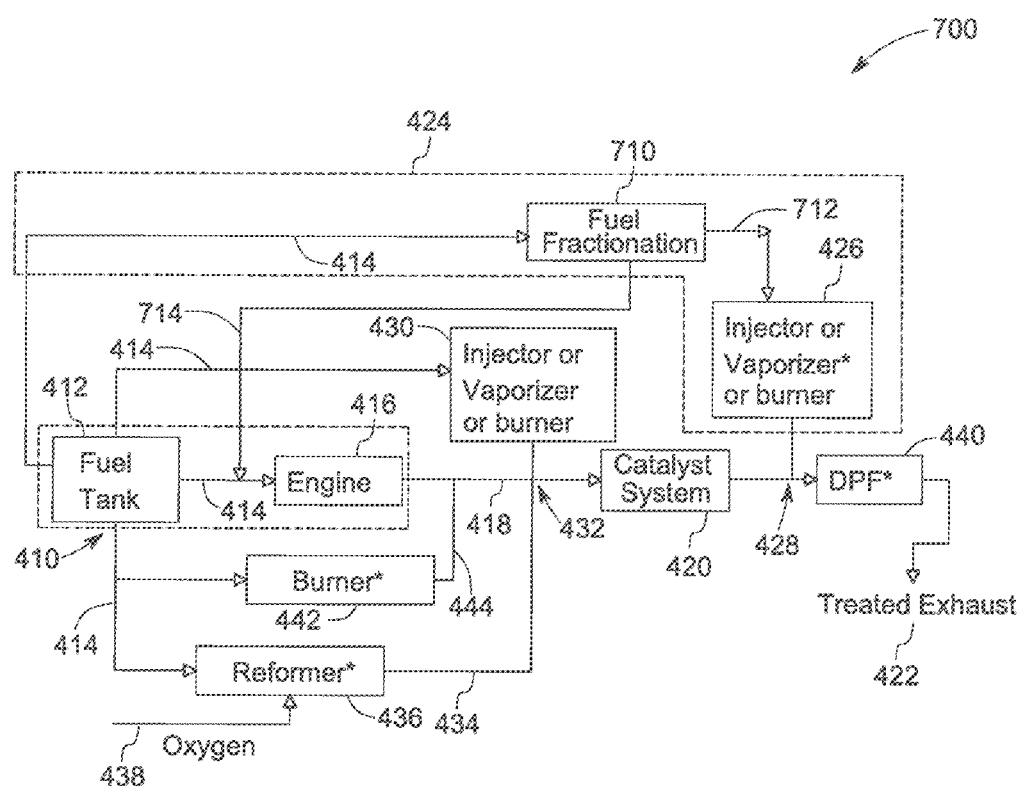
FIG. 7 is a schematic diagram depicting an exhaust system comprising the catalyst system set-up in accordance with an embodiment of the invention.

Referring to FIG. 7, an exhaust system 700 capable of reducing $NO_x$ is provided. The exhaust system 700 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system may also comprise a reductant delivery system 424 configured to deliver a reductant. The reductant delivery system 424 comprises a fuel fractionator 510 and an injector or vaporizer or burner 426. In one embodiment, the reductant comprising the fuel 414 is first passed through the fuel fractionator 710 to provide a light fuel fraction 712 and a heavy fuel fraction 714. The light fuel fraction 712 comprises hydrocarbons having an average carbon chain length of less than about 12 carbons and the heavy fuel fraction 714 comprises hydrocarbons having an average carbon chain length of greater than about 12 carbons. The light fuel fraction 712 is delivered to the catalyst system 420 from the fuel tank 412 via an injector or vaporizer or burner 426 through the point of injection 428. In one embodiment, a portion of the fuel 414 may be delivered to the catalyst system 420 by the exhaust stream 418 from the fuel tank 412 via an injector or vaporizer or burner 430 through the point of injection 432. The heavy fuel fraction 714 is delivered to the engine 416 through the fuel 414. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 432. In one embodiment, a DPF 440 is located after the catalyst system 420 and exhaust stream 418 is passed through the catalyst system 420 and the DPF 440 before exiting as the treated exhaust stream 422. In this embodiment, the reductant comprising the light fuel fraction 712 and the co-reductant 434 are delivered to the exhaust stream 418 through the point of injection 428. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 is connected in the exhaust stream between the engine 416 and the point of injection 432 of the reductant comprising fuel 414 and the co-reductant 434 in the exhaust stream 418.

Figure 8:
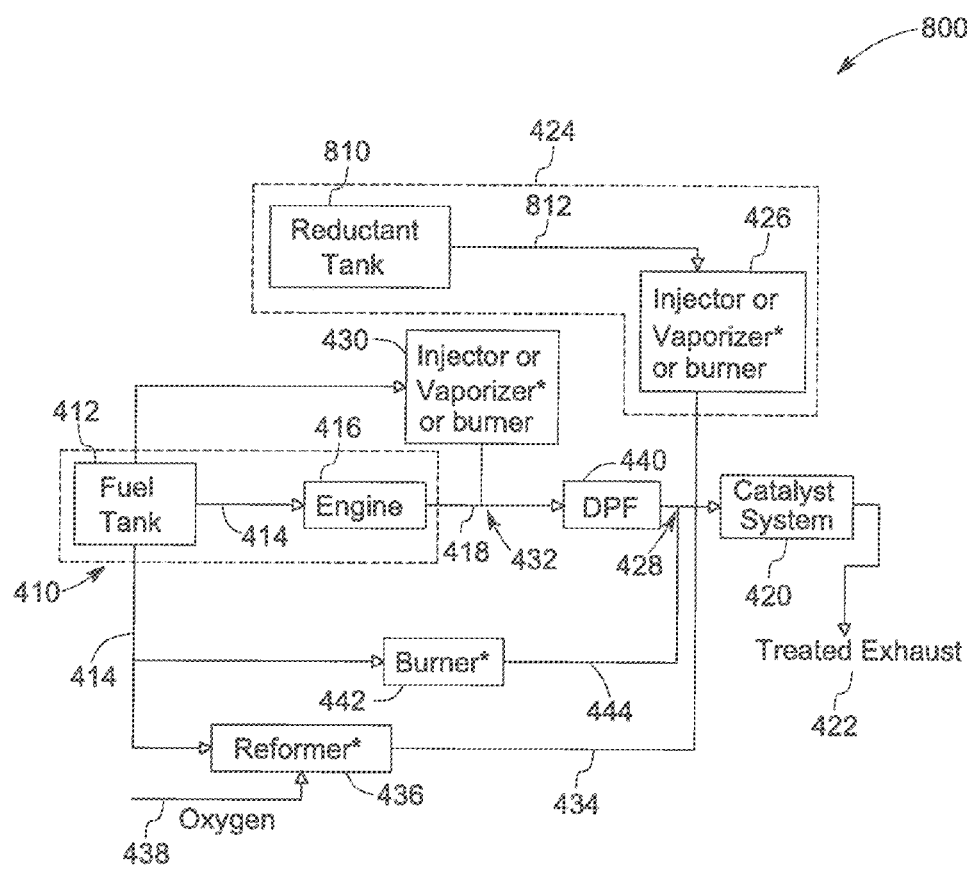
FIG. 8 is a schematic diagram depicting an exhaust system comprising the catalyst system setup in accordance with an embodiment of the invention.

Referring to FIG. 8, an exhaust system 800 capable of reducing $NO_x$ is provided. The exhaust system 800 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system may also comprise a reductant delivery system 424 configured to deliver a reductant. In one embodiment, the reductant is not the same as the fuel. In this embodiment, a reductant tank 810 is provided to deliver the reductant 812 to the catalyst system 422 via the injector or vaporizer or burner 426 to the point of injection 428. In one embodiment, a portion of the fuel 414 may be delivered to the catalyst system 420 by the exhaust stream 418 from the fuel tank 412 via an injector or vaporizer or burner 430 through the point of injection 432. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 428. In one embodiment, a DPF 440 is located between the engine 416 and the catalyst system 420 before the point of injection 428. In this embodiment, the reductant 812 and the co-reductant 434 are delivered to the catalyst system 420 through the point of injection 428 after the exhaust stream 418 is passed through the DPF 440. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 may be located between the DPF 440 and the point of injection 428 of the reductant 812 and the co-reductant 434 in the exhaust stream 418.

Figure 9:
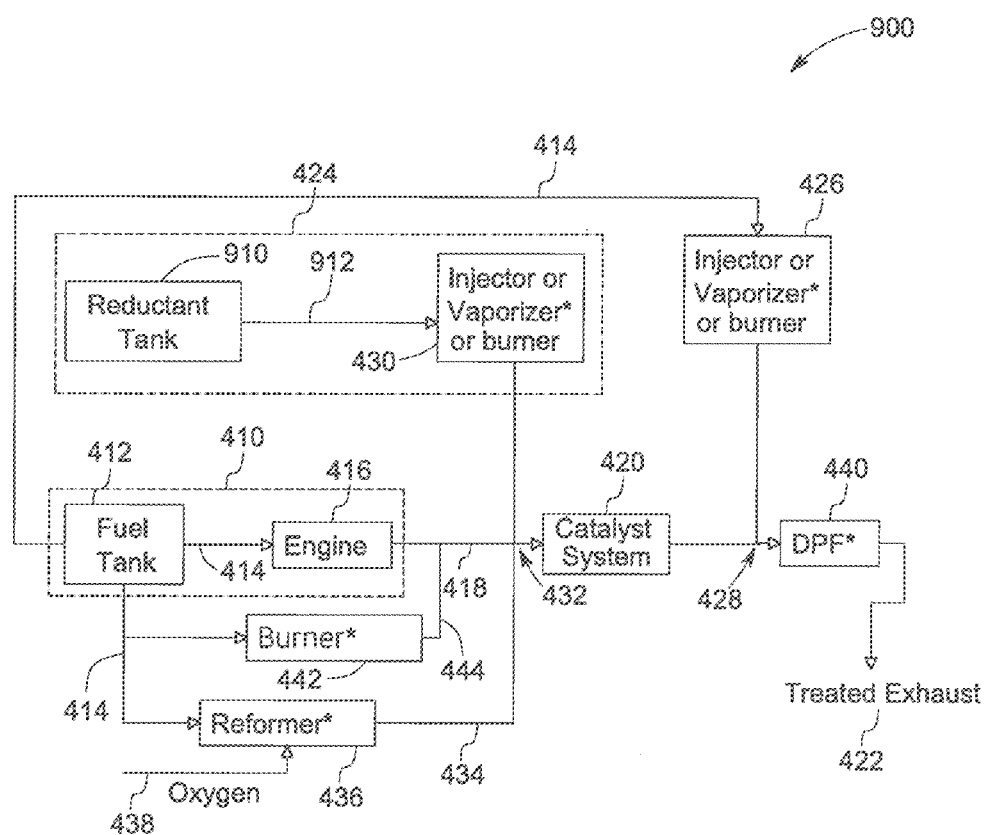
FIG. 9 is a schematic diagram depicting an exhaust system comprising the catalyst system set-up in accordance with an embodiment of the invention.

Referring to FIG. 9, an exhaust system 900 capable of reducing $NO_x$ is provided. The exhaust system 900 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system may also comprise a reductant delivery system 424 configured to deliver a reductant. In one embodiment, the reductant is not the same as the fuel. In this embodiment, a reductant tank 910 is provided to deliver the reductant 912 to the exhaust stream 418 from the reductant tank 910 via an injector or vaporizer or burner 430 and the exhaust stream 418 carries the reductant 912 to the catalyst system 420 through the point of injection 432. In one embodiment, a portion of the fuel 414 is delivered to the catalyst system 420 from the fuel tank 412 via an injector or vaporizer or burner 426 through the point of injection 428. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 432. In one embodiment, a DPF 440 is located after the catalyst system 420 and exhaust stream 418 is passed through the catalyst system 420 and the DPF 440 before exiting as the treated exhaust stream 422. In this embodiment, the reductant comprising the fuel 414 is delivered to the exhaust stream 418 through the point of injection 428 which lies between the catalyst system 420 and the DPF 440. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 is connected in the exhaust stream between the engine 418 and the point of injection 432 of the reductant 912 and the co-reductant 434 in the exhaust stream 418.

In still yet another embodiment, is provided a catalyst system comprising a first catalytic composition comprising a homogeneous solid mixture containing at least one catalytic metal and at least one metal inorganic support; wherein the pores of the solid mixture have an average diameter in a range of about 1 nanometer to about 15 nanometers; wherein the catalytic metal comprises nanocrystals; and wherein the nanocrystals have a PSD of less than about 20 percent. The catalytic metal is present in an amount of equal or less than about 6 mole percent based on the weight of the homogenous solid mixture.

EXAMPLES

The following examples illustrate methods and embodiments in accordance with the invention, and as such should not be construed as imposing limitations upon the claims. These examples demonstrate the manufacture of the catalyst compositions described herein and demonstrate their performance compared with other catalyst compositions that are commercially available. Unless specified otherwise, all components are commercially available from common chemical suppliers such as Aldrich (St. Louis, Mo.), Gelest. (Morrisville, Pa.), Spectrum Chemical Mfg. Corp. (Gardena, Calif.), and the like. The component and the source are listed in Table 1 given below.

TABLE 1

| Component | Source |
| --- | --- |
| Ethylacetoacetate | Aldrich |
| triton X114 | Aldrich |
| aluminum (sec-butoxide)$_3$ | Gelest |
| silver nitrate | Strem chemicals |
| isopropyl alcohol | EM Scientific |
| iron-zeolite and copper-zeolite | Umicore |

Example 1

Preparation of Silver Nanocrystals

To a 3-neck flask equipped with a stirrer was charged silver acetate (4 millimoles, SA), oleic acid (4 milliliters, OA, technical grade, 90 percent, Aldrich) and trioctylamine (15 milliliters, TOA) at a temperature of about 25 degrees Celsius (room temperature). The resultant mixture was heated under a vacuum of 1 millimeter of mercury to a temperature of about 60 degrees Celsius. As the temperature increased the silver acetate started to dissolve in the trioctylamine. Bubbling was observed in the flask, due the boiling of water present as an impurity in the reaction material. The water was removed under vacuum in the form of water vapor. When the temperature rose to 60 degrees Celsius, silver acetate was completely dissolved in the trioctylamine and the resultant solution turned to a brown-grey-black color, indicating the decomposition of silver acetate and the formation of silver nanocrystals. The temperature was then increased to 90 degrees Celsius and the mixture was maintained at this temperature for about two hours to ensure completion of the reaction. The resultant mixture was cooled to 25 degrees Celsius, and the black colored solution was transferred to centrifuge tubes of 50 milliliters capacity. 25 milliliters of ethanol was added to the centrifuge tubes and immediate precipitation was observed. The centrifuge tubes were placed in a lab centrifuge (Centra CL2) and centrifuged for about 10 minutes. After centrifuging the mixture in the centrifuge tubes separated into a yellowish brown supernatant liquid on the top and a black precipitate on the bottom. The supernatant liquid was discarded by pouring it out and the black precipitate weighed about 0.5 grams. After draining out the ethanol completely, 20 milliliters of hexane was added to the tube to provide a silver nanocrystals in hexane (AgNC in hexane) solution. An aliquot 5 milliliters of AgNC in hexane solution was dried. The resultant solid was weighed to determine the concentration of AgNC in hexane. 5 milliliters of AgNC hexane solution provided 32.4 grams per liter to about 53.9 grams per liter (i.e., 0.3 moles to 0.5 moles) of AgNC on drying. The amount of reactants used, the concentration of AgNC in hexane and the PSD of AgNC are include in Table 3 below.

Figure 10:
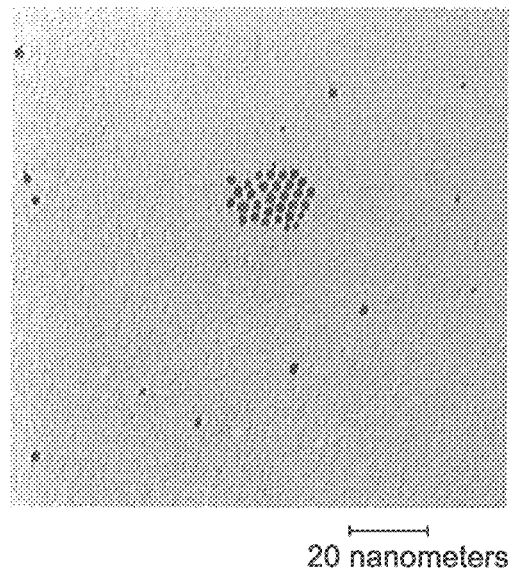
FIG. 10 is a Transmission Electron Microscopy (TEM) of silver nanocrystals in accordance with an embodiment of the present invention.
Figure 11:
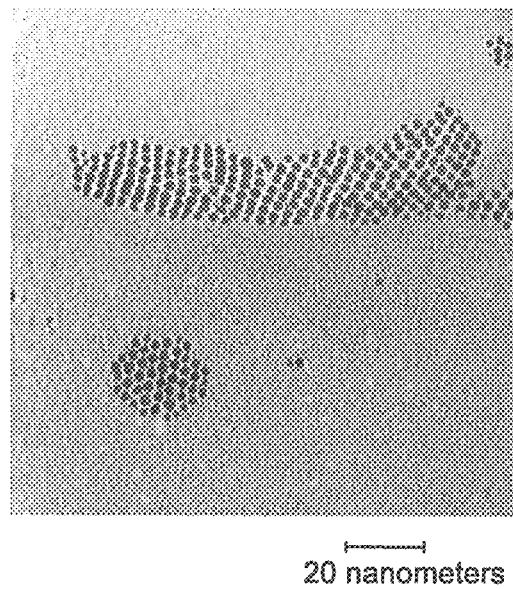
FIG. 11 is a TEM of silver nanocrystals in accordance with an embodiment of the present invention.
Figure 12:
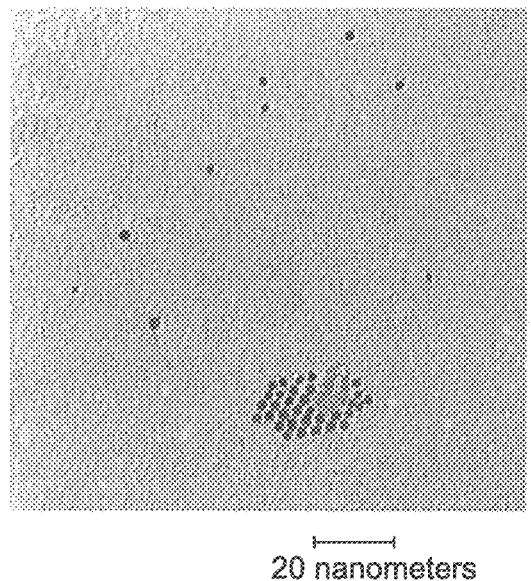
FIG. 12 is a TEM of silver nanocrystals in accordance with an embodiment of the present invention.
Figure 13:
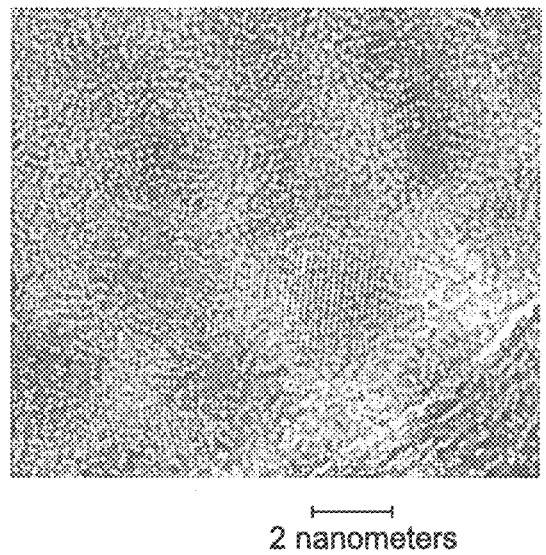
FIG. 13 is a TEM of silver nanocrystals in accordance with an embodiment of the present invention.

As mentioned above, the PSD was determined by transmission electron microscopy (TEM) and image analysis. A high magnification picture was taken by TEM that covered hundreds of individual AgNC. The average particle size and standard deviation were determined by counting each particle using image analysis. FIGS. 10, 11, and 12 show the TEM of the AgNC with a 20 nanometers scale bar and FIG. 13 shows the TEM of AgNC with a 2 nanometers scale bar.

Figure 14:
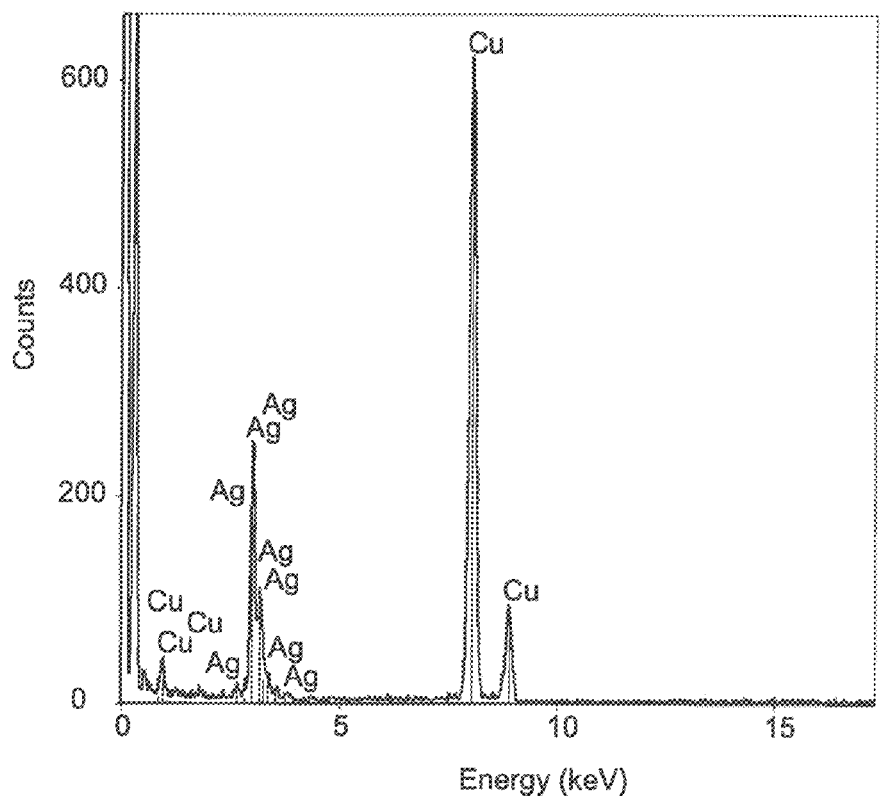
FIG. 14 is an Energy-Dispersive X-ray spectroscopy (EDS) of silver nanocrystals in accordance with an embodiment of the present invention.

FIG. 14 shows the EDS of the AgNC. EDS is an analytical technique used for the elemental analysis or chemical characterization of a sample. EDS relies on the investigation of a sample through interactions between electromagnetic radiation and matter, analyzing x-rays emitted by the matter in response to being hit with charged particles. Its characterization capabilities are due in large part to the fundamental principle that each element has a unique atomic structure allowing X-rays that are characteristic of an element's atomic structure to be identified uniquely from each other. To stimulate the emission of characteristic X-rays from a specimen, a high energy beam of charged particles such as electrons or protons, or a beam of X-rays, is focused into the sample being studied. At rest, an atom within the sample contains ground state (or unexcited) electrons in discrete energy levels or electron shells bound to the nucleus. The incident beam may excite an electron in an inner shell, ejecting it from the shell while creating an electron hole where the electron was initially present. An electron from an outer, higher energy shell then fills the hole, and the difference in energy between the higher energy shell and the lower energy shell may be released in the form of an X-ray. The number and energy of the X-rays emitted from a specimen can be measured by an energy dispersive spectrometer. As the energy of the X-rays are characteristic of the difference in energy between the two shells, and of the atomic structure of the element from which they were emitted, this allows the elemental composition of the specimen to be determined. The EDS spectra clearly shows the presence of silver atoms.

The AgNC prepared in Example 1 was diluted with hexane and was analyzed using UV-Vis spectrometry. The absorbance at different wavelengths is included below in Table 2.

TABLE 2

| Wavelength in nanometers | Absorbance arb. units |
| --- | --- |
| 800 | 12.01 |
| 750 | 12.02 |
| 700 | 12.02 |

TABLE 2-continued

| Wavelength in nanometers | Absorbance arb. units |
|---|---|
| 650 | 12.03 |
| 600 | 12.05 |
| 550 | 12.1 |
| 500 | 12.25 |
| 475 | 12.5 |
| 450 | 13.2 |
| 430 | 14.3 |
| 410 | 14.9 |
| 390 | 14.2 |
| 375 | 13.6 |
| 350 | 12.9 |
| 325 | 12.4 |
| 300 | 12.6 |
| 250 | 12.9 |
| 200 | 13.1 |

Figure 15:
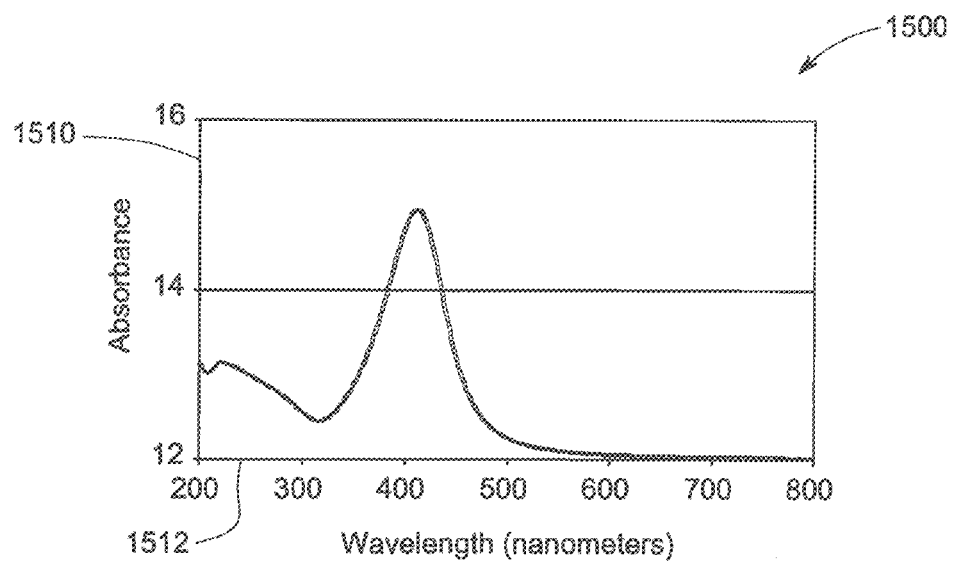
FIG. 15 is an ultraviolet-visible (UV-Vis) spectroscopy of silver nanocrystals in accordance with an embodiment of the present invention.

Referring to FIG. 15, a graph 1500 of absorbance on the Y-axis 1510 versus wavelength in nanometers on the X-axis 1512 is provided. The graph shows an absorption maxima at a wavelength of about 411 nanometers indicating the presence of AgNC.

Examples 2-3

Preparation of Silver Nanocrystals

Examples 2 and 3 were carried out in a manner similar to that described above in Example 1 except in that they were carried out in relatively larger scales. The amounts of silver acetate, oleic acid, and trioctylamine used and the resultant concentration of AgNC in hexane and PSI) of AgNC are included in Table 3 below. Examples 2 and 3 show that a PSD of less that 10 percent can be achieved even in large scale batches.

TABLE 3

| Example | SA (millimoles) | OA (milliliters) | TOA (milliliters) | Concentration of AgNC in hexane (grams per liter) | PSD of AgNC |
|---|---|---|---|---|---|
| 1 | 4 | 4 | 15 | 32.4 to 53.9 | Less than 10 percent |
| 2 | 40 | 40 | 80 | 32.4 to 53.9 | Less than 10 percent |
| 3 | 100 | 100 | 200 | 32.4 to 53.9 | Less than 10 percent |

Examples 4-7

Preparation of First Catalytic Composition

To a 3-neck flask equipped with a stirrer was charged aluminum (sec-butoxide)$_3$ (50 grams) and IPA (200 milliliters). A predetermined amount of AgNC in hexane solution containing 43.1 grams (0.4 moles) AgNC in hexane, was then added to the flask to form a first solution. The predetermined amount of AgNC in hexane solution added and the resultant loading of AgNC obtained in the catalyst composition is included in Table 4 below. Following the addition to the flask, the mechanical stirrer was turned on using a speed of about 60 revolutions per minute in another separate flask, ethyl acetoacetate (2.65 grams), Triton X-114 (14 grams), and 65 milliliters isopropyl alcohol were added to form a second solution. The second solution was then poured into the first solution. The resultant mixture was stirred for about 30 minutes at a speed of about 180 revolutions per minute at a temperature of about 25 degrees Celsius. During the 30-minute stir period, a mixture of 7.5 milliliters distilled water and 85 milliliters isopropyl alcohol was added drop-wise using a syringe pump.

After 30 minutes the rate of addition was adjusted to 0.6 milliliters per minute and the addition was completed over a period of 2.5 hours under vigorous stirring at about 200 revolutions per minute. The hydrolysis was controlled by the amount of water and the additional rate. During the hydrolysis process, the solution in the flask gradually turned into a white gel, the gel became thicker and this slowed down the stirring speed. To account for the gain in viscosity of the gel the stirrer dial was set at 300 revolutions per minute while the actual speed achieved was about 100 to 150 rpm. When the addition of water/IPA mixture was completed the hydrolysis was complete and a white gel with high viscosity was formed. The mixture was stirred at a temperature of about 25 degrees Celsius for approximately 0.5 hours following the completion of hydrolysis. After about 0.5 hours, the reaction mixture was heated to 60 degrees Celsius and was maintained at 60 degrees Celsius for 24 hours with stirring at about 60 revolutions per minute. On heating to 60 degrees Celsius the white gel lost its viscosity and started becoming dark brown in color. After ageing for 24 hours at 60 degrees Celsius the resultant gel turned dark brown in color. The gel was then filtered with a standard lab vacuum filtration system with a 150 millimeter diameter Buchner funnel and No. 50 Whatman filter paper. A typical filtration takes about 12 to 24 hours. The filtered gel was vacuum oven dried at 60 degrees Celsius under a vacuum of 125 millimeters of mercury and calcined at 550 degrees Celsius. The final silver nanocrystal concentration showed good consistency with the loading level with an error of +/−0.2 weight percent. The catalytic composition is called as AgNCMPA (silver nanocrystals in mesoporous alumina)

TABLE 4

| Example | AgNC in hexane solution milliliters (43.1 grams per liter (0.4 moles) AgNC in hexane) | AgNC loading in catalyst composition (mole percent AgNCMPA) |
|---|---|---|
| 4 | 5 | 2 |
| 5 | 7.5 | 3 |
| 6 | 10 | 4 |
| 7 | 12.5 | 5 |

Figure 16:
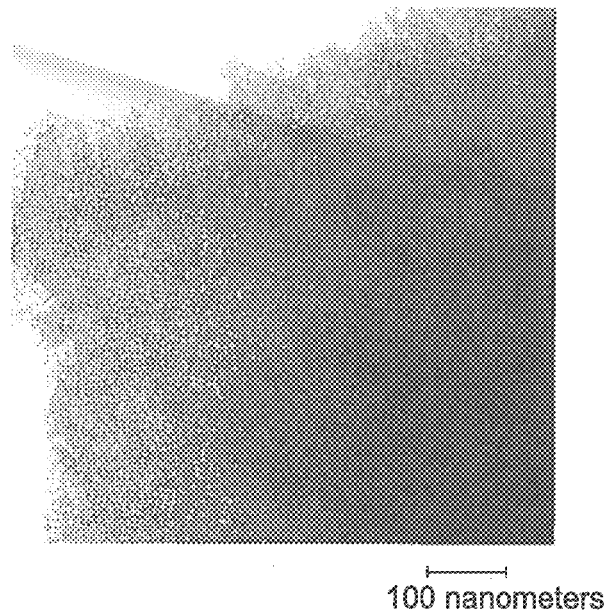
FIG. 16 is a TEM of a homogenous solid mixture containing silver in accordance with an embodiment of the present invention.
Figure 17:
FIG. 17 is a TEM of a homogenous solid mixture containing silver in accordance with an embodiment of the present invention.
Figure 18:
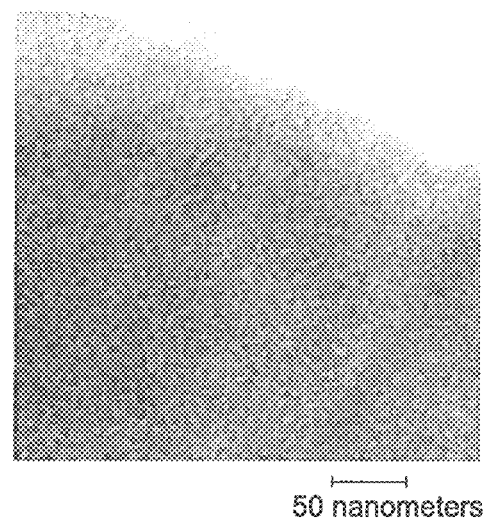
FIG. 18 is a TEM of a homogenous solid mixture containing silver in accordance with an embodiment of the present invention.

The PSD of the catalyst composition was determined by TEM and image analysis. A high magnification picture was taken by TEM that covered AgNC and the substrate particles, in this alumina. The average particle size and standard deviation were determined by counting each particle using image analysis. FIGS. 16, 17, and 18 show the TEM of the AgNC on a 100 nanometers, 20 nanometers and a 50 nanometers scale respectively.

Figure 19:
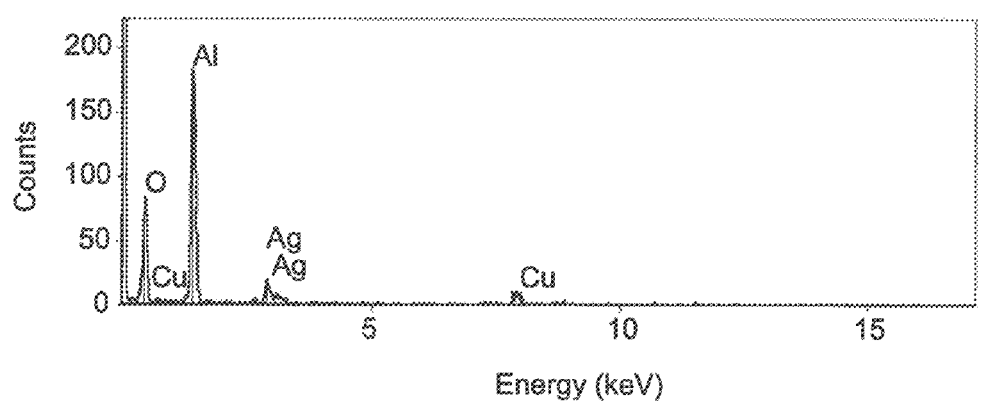
FIG. 19 is an EDS of a homogenous solid mixture containing silver in accordance with an embodiment of the present invention.

FIG. 19 shows the EDS of the catalyst composition including the AgNC. As is shown in the graph, the EDS shows the presence of elements aluminum, oxygen, and silver, thus confirming the elemental composition of the homogenous solid mixture that forms the first catalytic composition.

Stability of AgNC in Hexane Solution

The AgNC in hexane solution was stable i.e., the particles did not exhibit degradation or particle size change for a period of at least 6 months. The stability of AgNC in hexane solution may be attributed to the surface ligand, oleic acid, which acts as a surfactant and protects AgNC from degradation. The thermodynamic stability may be attributed to a thin layer of silver oxide on the nanocrystal surface which functions to stabilize the silver core. This silver oxide layer is so thin that it may usually not be detectable by X-ray diffraction (XRD). The dark color of AgNC may also be attributed to this oxide layer.

Hydrothermal Stability of the First Catalytic Composition (AgNCMPA (Silver Nanocrystals in Mesoporous Alumina))

Figure 20:
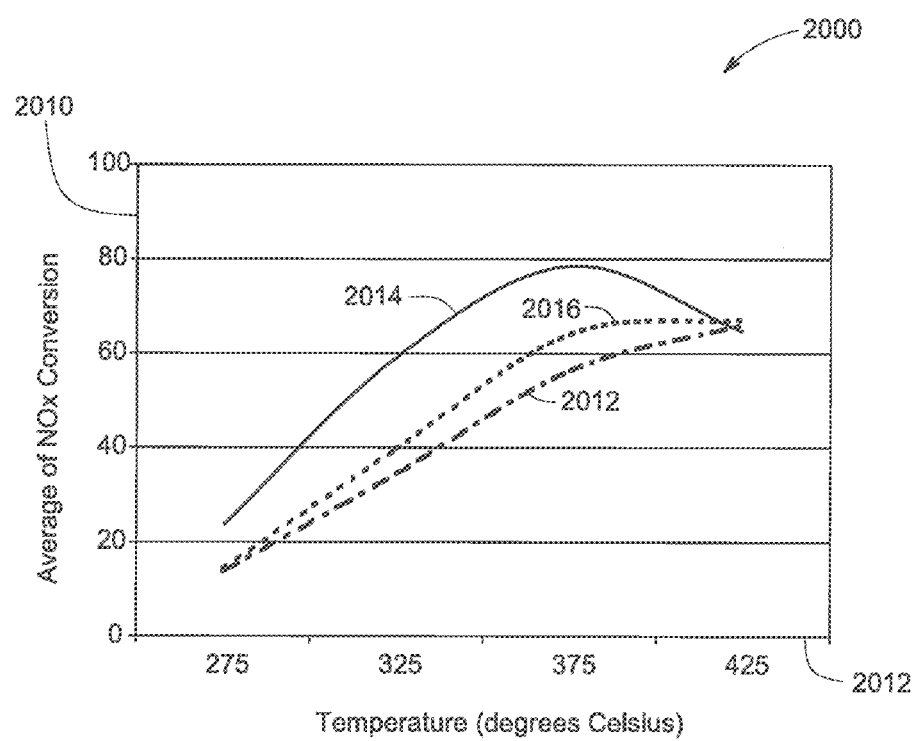
FIG. 20 is a bar graph depicting $NO_x$ conversion in accordance with an embodiment of the present invention.
Figure 21:
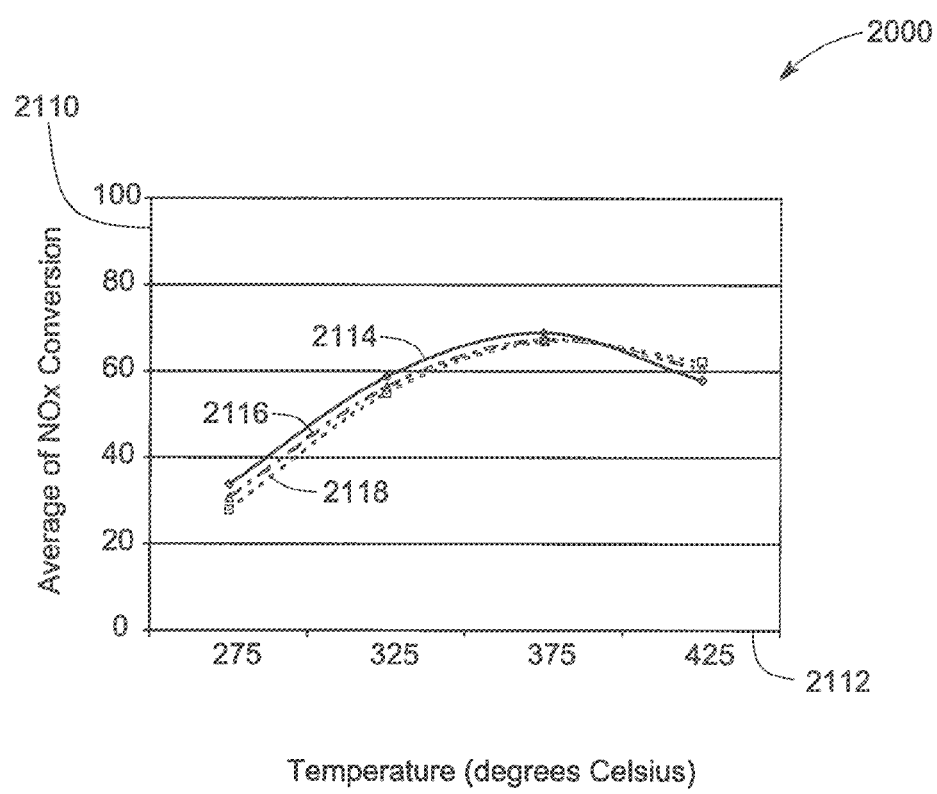
FIG. 21 is a bar graph depicting $CO_2$ conversion in accordance with an embodiment of the present invention.

The hydrothermal stability of the AgNCMPA (silver nanocrystals an mesoporous alumina) catalyst was studied by determining the $NO_x$ conversion capability after hydrothermal ageing for 48 hours and 144 hours as shown in FIGS. 20 and 21. Referring to FIGS. 20 and 21, graphs 2000 and 2100 show the $NO_x$ conversion shown on Y-axis 2010, 2110 at different temperatures shown on X-axis 2012, 2112 for the catalysts prepared in Example 5 (3 weight percent sol-gel) and Example 6 (4 weight percent sol-gel) respectively. Curves 2014 shows the $NO_x$ conversion for a catalyst composition prepared using a freshly prepared AgNCMPA catalyst, curve 2016 shows the $NO_x$ conversion for the catalyst that was aged for about 48 hours at 25 degrees Celsius, and curve 2018 shows the $NO_x$ conversion for a catalyst that was aged for about 144 hours at 25 degrees Celsius for the catalyst composition prepared according to Example 5. Similarly Curve 2114 shows the $NO_x$ conversion for a catalyst composition prepared using a freshly prepared AgNCMPA catalyst, curve 2116 shows the $NO_x$ conversion for a catalyst composition prepared using the catalyst that was aged for about 48 hours at 25 degrees Celsius, and curve 2118 shows the $NO_x$ conversion for the catalyst that was aged for about 144 hours at 25 degrees Celsius for the catalyst composition prepared according to Example 6. The curves 2014, 2114, 2016, 2116, 2018 and 2118 indicated that there is not much degradation in the $NO_x$ conversion and hence indicate that the hydrothermal stability of AgNCMPA catalyst.

Example 8

Preparation of First Catalytic Composition Pilot Scale

Example 4 was carried out in a manner similar to that described above in Examples 4-7 except that it was carried out on a pilot scale. A 100 gallon reactor was employed. The quantities of reactants used included aluminum (sec-butoxide)$_3$ (15 kilograms), silver nanocrystals (1.27 mole or 136 grams), resulting in 4 weight percent loading of silver nanocrystals in the homogenous solid mixture that formed the catalytic composition.

Comparative Example 1

Preparation of Catalyst Composition

The metal inorganic support was manufactured by making a first solution, a second solution and a third solution, which were mixed together. The first solution of aluminum (sec-butoxide)$_3$ (500 grams, 2 moles) and isopropylalcohol (2 liters) was loaded in a five liter, 3-neck flask equipped with an addition funnel, a condenser, and a mechanical stirrer at a temperature of about 25 degrees Celsius (room temperature). The second solution included ethyl acetoacetate (26.5 grams, 0.2 moles), TRITON X-114 (139 grams; templating agent) and isopropylalcohol (500 milliliters). The second solution was added to the first solution with stirring in one lot and the resultant mixture was maintained at 25 degrees Celsius for about 30 minutes. The third solution includes water (75 milliliters, 4 moles), silver nitrate (5.33 grams, 0.03 moles) and isopropylalcohol (950 milliliters) and was added to the mixture including the first and the second solutions via the addition funnel over a period of about 90 minutes at rate of 12 milliliters per minute. The resultant reaction mixture was maintained at 25 degrees Celsius for about 3 hours and then heated to reflux and maintained at reflux for about 20 hours to 24 hours.

The flask was then cooled to 25 degrees Celsius and the contents were filtered using a number 50 paper Whatman filter. The solid was then subjected to Soxhlet extraction with ethanol for about 20 hours to about 24 hours. The solid was then dried in a vacuum oven 125 millimeter of mercury at 80 degrees Celsius to yield about 164 grams of the product. The dry product was heated under a flow of nitrogen in a tube furnace from 25 degrees Celsius to 550 degrees Celsius at a heating rate of about 2 degrees Celsius per minute in about 260 minutes. After achieving the temperature of 550 degrees Celsius the dry product was maintained at 550 degrees Celsius for 1 hour. Afterwards, the product was calcined in a flow of air at 550 degrees Celsius for about 5 hours. Calcination was carried out to remove any residual templating agent. The substrate had a surface area in a range of about 300 square millimeters per gram to about 600 square millimeters per gram. The catalyst composition had a 3 mole percent silver loading. The catalyst prepared in Comparative Example 1 is called AgMPA (Ag in a mesoporous alumina).

Test Conditions

The test conditions for the aforementioned catalyst compositions are as follows. The prepared catalyst materials were weighed out (~50 mg) and placed in 2 milliliters GC vials until used in the reactor. The catalysts were pretreated with 7 percent water, 30 parts per million sulfur dioxide, and 12 percent oxygen and balance nitrogen for about 7 hours at 450 degrees Celsius to "age" or "sulfur soak" the catalysts. The samples from the Examples listed above were disposed in a high throughput screen (HTS) reactor to determine their nitrogen oxide conversion capabilities in a simulated exhaust gas stream. The reactor had 32 tubes, each tube of which can receive a catalyst composition. No catalyst was placed in the tube #1. Tube #1 was used to measure the $NO_x$ concentration in the exhaust gas stream and thus provides the reference for the $NO_x$ conversion. Tube #32 was loaded with DOC catalyst, which converts reductant to $CO_2$. It was used to calibrate the C to N ratio. The catalyst composition Samples are placed in the other tubes and the reduction in $NO_x$ concentration was measured. 3 to 4 replicates were used for each catalyst composition and the $NO_x$ conversion value is the average of the replicates. The reduction in $NO_x$ concentration relates to catalytic activity of the catalyst compositions.

The simulated exhaust gas stream contained an exhaust gas composition and a reductant. The composition of the simulated exhaust stream used was 7 percent water, 1 part per million sulfur dioxide, 300 parts per million nitrous oxide, 12 percent oxygen and balance nitrogen. The NQ conversion results for the catalyst compositions with the diesel reductant are shown in the FIG. 22. For all the samples, using the HTS reactor, the $C_1:NO_x$ ratio used in the exhaust gas composition is 4 or 6 ($C_1$:$NO_x$ is defined as the number of carbon atoms in the reductant stream per number of nitrogen oxide (NO) molecules). Three samples of each catalyst were tested in each run and each catalyst was tested at four temperatures ~275 degrees Celsius, 325 degrees Celsius, 375 degrees Celsius, and 425 degrees Celsius. The reductant used was fraction 1 of ULSD. After each reduction, there was a burn-off step of 1 hour at 500 degrees Celsius in air.

Data is presented as percent $NO_x$ conversion by measuring the $NO_x$ concentration through tube #1 with no catalyst present and measuring the $NO_x$ concentration over the other tubes with catalysts and determining the percent change. The $CO/CO_2$ concentrations are also presented to understand the extent of reductant conversion to $CO/CO_2$. Table 5 provides the average $NO_x$ conversion values and average $CO_2$ conversion values of the samples having 2, 3, 4, and 5 mole percent AgNC sol-gel prepared in Examples 4-7. The samples are designated as percent loading of AgNC in mesoporous alumina (2AgNCMPA, 3AgNCMPA, 4AgNCMPA, and 5AgNCMPA). Table 5 also provides average $NO_x$ conversion values and average $CO_2$ conversion values of the sample AgMPA prepared in Comparative Example 1.

TABLE 5

| Example | Temperature degrees Celsius | Average $NO_x$ conversion percent | Standard deviation of $NO_x$ conversion | Average $CO_2$ conversion percent | Standard deviation of $CO_2$ conversion |
|---|---|---|---|---|---|
| 4 (2AgNC MPA) | 275 | 24.9 | 3.3 | 16.2 | 2.6 |
|  | 325 | 40.5 | 5.3 | 33.5 | 3.9 |
|  | 375 | 48.1 | 3.4 | 58.9 | 4.1 |
|  | 425 | 22.9 | 1.9 | 77.6 | 2.3 |
| 5 (3AgNC MPA) | 275 | 34.1 | 5.9 | 26.9 | 5.4 |
|  | 325 | 55.3 | 0.8 | 51.2 | 0.5 |
|  | 375 | 54.1 | 3.2 | 68.5 | 6.5 |
|  | 425 | 24.5 | 4.3 | 79.9 | 2.9 |
| 6 (4AgNC MPA) | 275 | 34.9 | 0.8 | 30. | 1.2 |
|  | 325 | 51.0 | 0.4 | 49.9 | 1.1 |
|  | 375 | 52.6 | 0.9 | 70.4 | 1.1 |
|  | 425 | 24.4 | 3.5 | 81.4 | 1.3 |
| 7 (5AgNC MPA) | 275 | 34.6 | 2.7 | 31.7 | 3.3 |
|  | 325 | 47.4 | 3.0 | 49.2 | 3.6 |
|  | 375 | 49.1 | 1.9 | 72.2 | 4.7 |
|  | 425 | 21.5 | 3.2 | 86.1 | 2.7 |
| CE-1 (AgMPA) | 275 | 29.1 | 4.5 | 20.3 | 3.7 |
|  | 325 | 46.4 | 2.6 | 39.6 | 2.2 |
|  | 375 | 52.5 | 2.4 | 62.7 | 2.1 |
|  | 425 | 20.9 | 3.8 | 81.1 | 1.3 |

Figure 22:
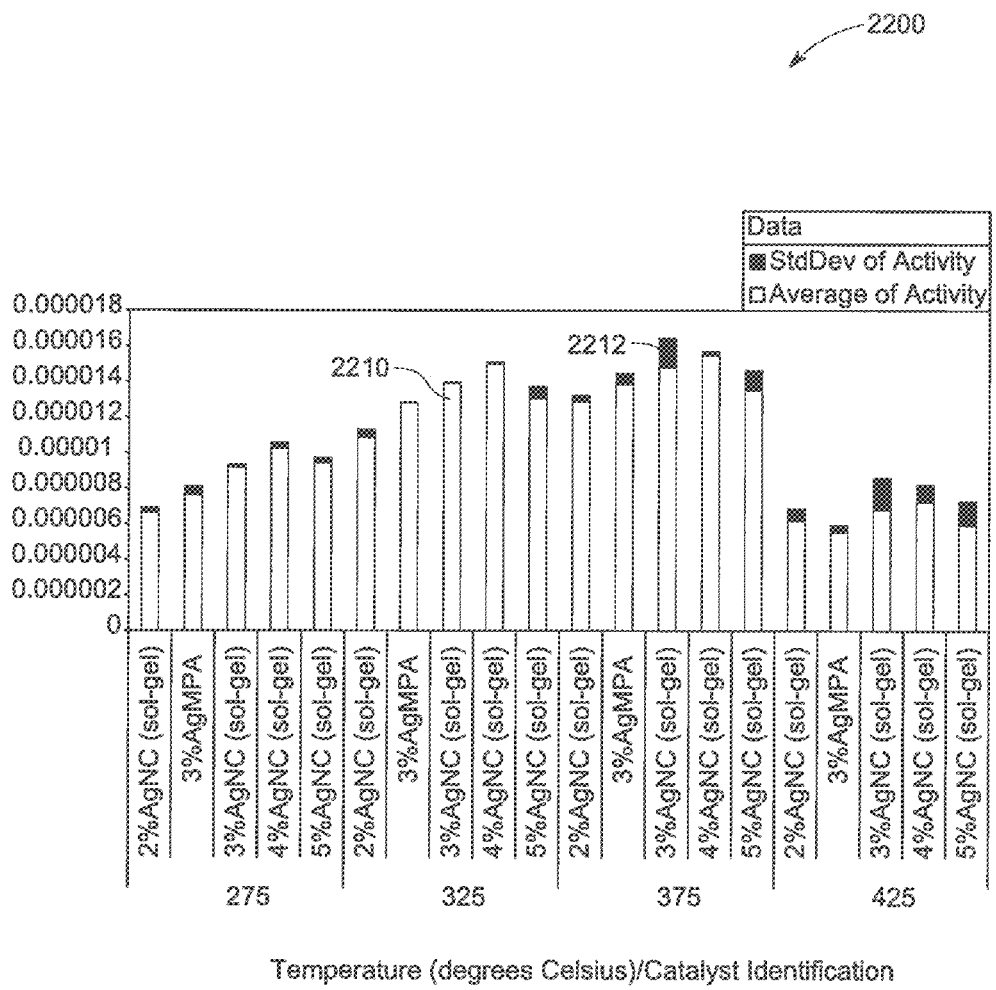
FIG. 22 is a graph of $NO_x$ conversion in presence of a catalyst at various temperatures in accordance with an embodiment of the present invention.
Figure 23:
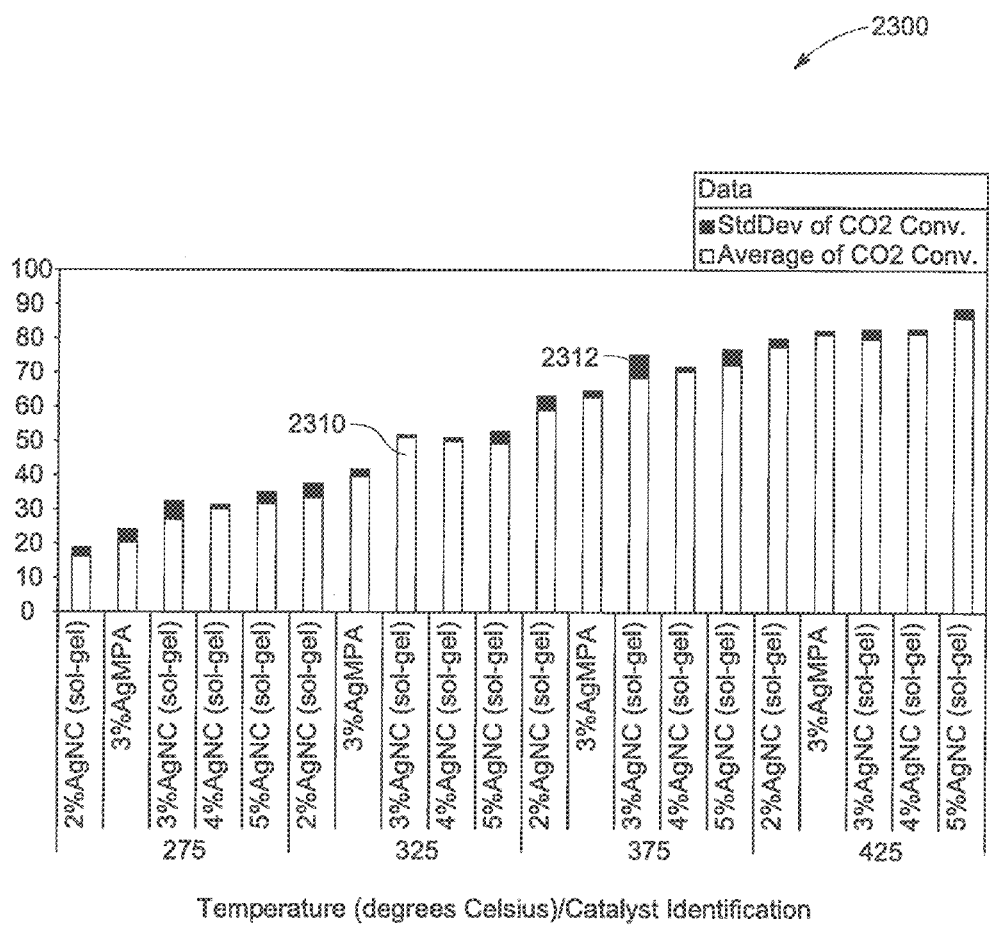
FIG. 23 is a graph of $NO_x$ conversion in presence of a catalyst at various temperatures in accordance with an embodiment of the present invention.

Referring to FIG. 22, a bar graph 2200 shows the average $NO_x$ conversion 2210 ((lower portion of each bar) and the standard deviation 2212 (the upper portion of each bar) for the 5 samples at the four temperatures mentioned above. Referring to FIG. 23, a bar graph 2300 shows average $CO_2$ conversion 2310 ((lower portion of each bar) and the standard deviation 2312 (the upper portion of each bar) for the 5 samples at the four temperatures mentioned above. The results provided in Table 5 show that at temperatures 325 and 375 degrees Celsius the catalysts show improved $NO_x$ reduction at all loadings of the silver nanocrystals. Further, among the different loadings 1, 3, 4, and 5 percent, 3 and 4 percent loadings show better $NO_x$ reduction capabilities when compared to the Comparative Example 1 while the 2 and 5 percent loading provide comparable conversion values with Comparative Example 1. The results also show the formation of $CO_2$ which indicates the combustion of diesel (ULSD).

Example 9

Performance of Catalyst Compositions

This example compares conversion performance of $NO_x$ contained in an exhaust gas streams for samples that include embodiments of the invention relative to comparative catalyst compositions. The comparative catalyst compositions do not contain nanocyrstals of the catalytic metal.

The catalysts are tested using the simulated exhaust gas stream as described above. The simulated exhaust gas stream contains an exhaust gas composition and a reductant. The reductant contains fraction 1 of ULSD.

The $NO_x$ conversion capability of the AgMPA catalyst prepared in Comparative Example 1 was compared with that of the Catalyst composition prepared in Example 5 (3AgNCMPA) at four temperatures. The data is provided in Table 6 below.

TABLE 6

| | Average $NO_x$ Conversion of catalyst composition (percentage) | |
|---|---|---|
| Temperature degrees Celsius | Example 5 3AgNCMPA | Comparative Example 1 AgMPA |
| 425 | 42.2 | 41.2 |
| 375 | 60.7 | 50.1 |
| 325 | 59.9 | 51.7 |
| 275 | 35.2 | 29.0 |

Figure 24:
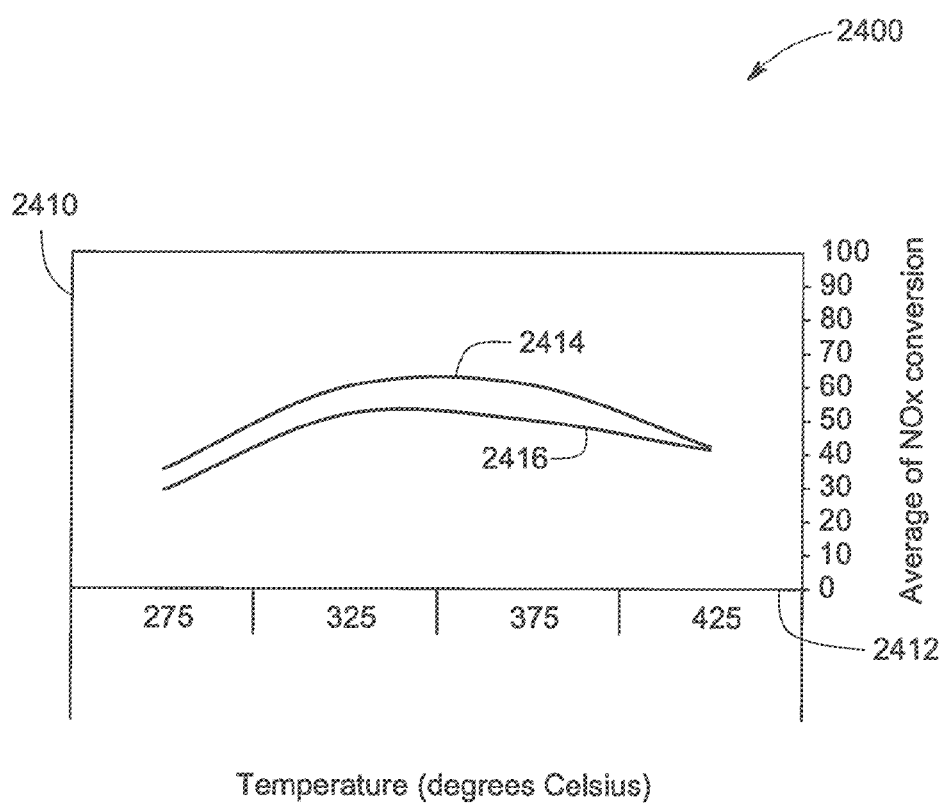
FIG. 24 is a graph of $NO_x$ conversion in presence of a catalyst at various temperatures in accordance with an embodiment of the present invention.

Referring to FIG. 24, a graph 2400 of average $NO_x$ conversion shown on the Y-axis 2410 at various temperatures shown on the X-axis 2412 is provided. The graph indicates that the $NO_x$ conversion capability of the catalytic composition of Example 5 indicated by curve 2414 is greater than that of the catalytic composition of Comparative Example 1 indicated by curve 2512 at all four temperatures. The catalytic compositions that include AgNC and the surfactants produce relatively superior results at all temperatures over the catalyst compositions that include a templated substrate and Ag.

The $NO_x$ conversion capability of the AgMPA catalyst prepared in Comparative Example 1 was compared with that of the catalytic composition prepared in Example 8 (4AgNCMPA). The data is provided in Table 7 below.

TABLE 7

| | Average $NO_x$ Conversion of catalyst composition (percentage) | |
|---|---|---|
| Temperature degrees Celsius | Example 8 4AgNCMPA | Comparative Example 1 AgMPA |
| 425 | 22.6 | 28.2 |
| 375 | 61.6 | 58.0 |
| 325 | 76.2 | 73.1 |
| 275 | 49.7 | 60.7 |

Figure 25:
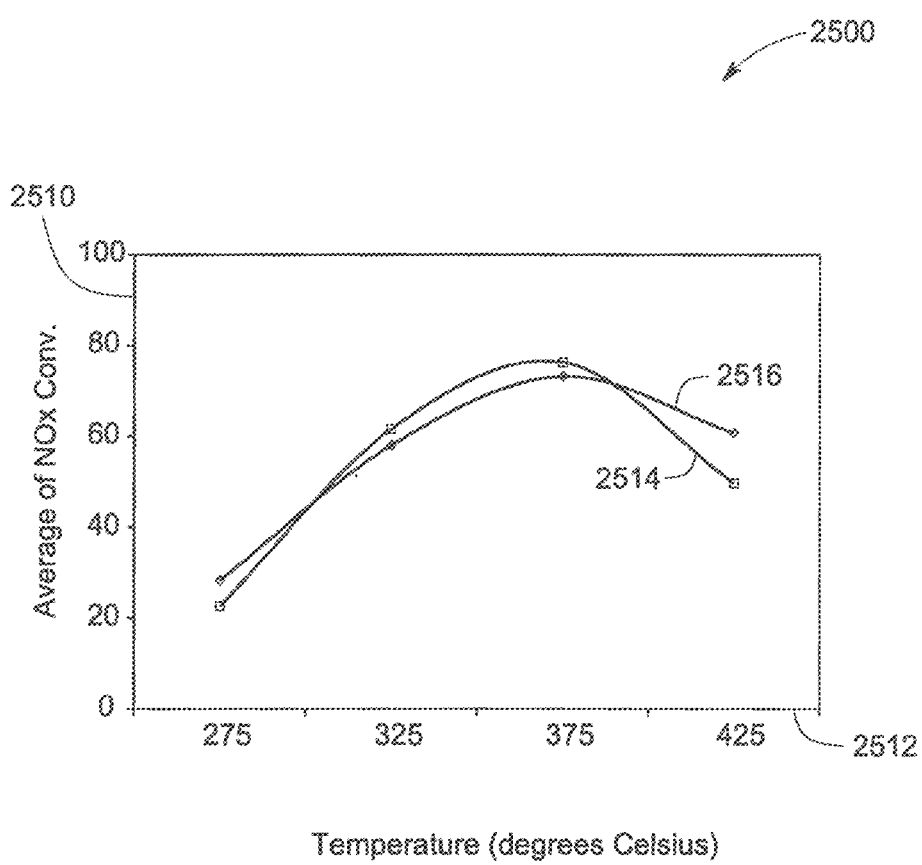
FIG. 25 is a graph of $NO_x$ conversion in presence of a catalyst at various temperatures in accordance with an embodiment of the present invention.

Referring to FIG. 25, a graph 2500 of average $NO_x$ conversion shown on the Y-axis 2510 at various temperatures shown on the X-axis 2512 is provided. The graph indicates that the $NO_x$ conversion capability of the catalyst prepared in Example 8 indicated by curve 2514 shows greater $NO_x$ conversions at 375 and 325 degrees Celsius and comparable $NO_x$ conversions at 425 and 275 degrees Celsius when compared to the catalyst composition of Comparative Example 1 indicated by curve 2512. This indicates that the catalytic composition prepared on a pilot scale provides comparable NO$_x$ conversions with catalytic compositions prepared on a lab scale, thus indicating the scalability of the examples.

With regard to the term reaction product, reference is made to substances, components, or ingredients in existence at the time just before first contacted, formed in situ, blended, or mixed with one or more other substances, components, or ingredients in accordance with the present disclosure. A substance, component or ingredient identified as a reaction product may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product.

All ranges disclosed herein are inclusive of the endpoints, and the endpoints are combinable with each other. The terms "first," "second," and the like as used herein do not denote any order, quantity, or importance, but rather are used to distinguish one element from another. The use of the terms "a" and "an" and "the" and similar referents in the context of describing the invention (especially in the context of the following claims) are to be construed to cover both the singular and the plural, unless otherwise indicated herein or contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method comprising:
   providing a solution comprising nanocrystals of at least one catalytic metal comprising silver metal;
   adding the solution comprising the nanocrystals to a solution comprising a precursor of a metal inorganic support to form a first solution; and
   forming a catalytic composition comprising a homogeneous solid mixture containing the nanocrystals and the metal inorganic support;
   wherein the metal inorganic support comprises alumina and pores of the metal inorganic support have an average diameter in a range of about 1 nanometer to about 15 nanometers.

2. The method of claim 1, wherein the step of preparing the solution comprising the nanocrystals comprises preparing the nanocrystals in the presence of a surfactant.

3. The method of claim 1, wherein the step of preparing the solution comprising the nanocrystals is carried out at a temperature in a range of about 10 degrees Celsius to about 200 degrees Celsius.

4. The method of claim 1, wherein the step of preparing the solution comprising the nanocrystals is carried out under vacuum in a range of about 0.5 millimeter of mercury to about 10 millimeter of mercury.

5. The method of claim 1, wherein the step of preparing the solution comprising the nanocrystals comprises preparing the nanocrystals having a particle size distribution of less than about 20 percent.

6. The method of claim 1, wherein the nanocrystals are present in an amount less than or equal to about 6 mole percent based on the weight of the homogenous solid mixture.

7. The method of claim 1, wherein forming the first solution further comprises adding a solvent to the solution comprising the precursor of the metal inorganic support.

8. The method of claim 1, further comprising:
   forming a second solution comprising a solvent, and a templating agent; and
   adding the second solution to the first solution to form a mixture.

9. The method of claim 1, wherein the step of preparing the solution comprising the nanocrystals comprises preparing the nanocrystals having a particle size distribution of less than about 15 percent.

10. The method of claim 1, wherein the step of preparing the solution comprising the nanocrystals comprises preparing the nanocrystals having a particle size distribution of less than about 10 percent.

11. The method of claim 1, wherein the nanocrystals are present in an amount in a range of from about 3 mole percent to about 4 mole percent based on the weight of the homogenous solid mixture.

12. The method of claim 1, wherein the nanocrystals are present in an amount less than or equal to about 3 mole percent based on the weight of the homogenous solid mixture.

13. The method of claim 1, wherein the nanocrystals are present in an amount less than or equal to about 4 mole percent based on the weight of the homogenous solid mixture.

* * * * *